United States Patent
Minakuchi et al.

(10) Patent No.: US 6,825,849 B1
(45) Date of Patent: Nov. 30, 2004

(54) METHOD AND APPARATUS FOR PRESENTING INFORMATION IN ACCORDANCE WITH PRESENTATION ATTRIBUTE INFORMATION TO CONTROL PRESENTATION THEREOF

(75) Inventors: Mitsuru Minakuchi, Soraku-gun (JP); Azusa Umemoto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 322 days.

(21) Appl. No.: 09/655,072

(22) Filed: Sep. 5, 2000

(30) Foreign Application Priority Data

Sep. 6, 1999 (JP) .......................................... 11-251686

(51) Int. Cl.[7] ............................ G09G 5/00; G06T 3/00
(52) U.S. Cl. ...................................... 345/581; 345/682
(58) Field of Search ................................ 345/581, 589, 345/672, 682, 467, 471; 707/500, 517, 523, 526–529; 715/517, 523, 526–529

(56) References Cited

U.S. PATENT DOCUMENTS

| | | | |
|---|---|---|---|
| 4,905,163 A | * | 2/1990 | Garber et al. ................... 706/55 |
| 5,515,082 A | * | 5/1996 | Hirschauer et al. ......... 345/556 |
| 5,561,736 A | * | 10/1996 | Moore et al. ................ 704/260 |
| 6,329,991 B1 | * | 12/2001 | Fukuda et al. .............. 345/629 |

FOREIGN PATENT DOCUMENTS

| | | |
|---|---|---|
| JP | 6-195388 | 7/1994 |
| JP | 9-190438 | 7/1997 |

OTHER PUBLICATIONS

Use of Sound on Alert Notification, Sep. 1, 1992, IBM Technical Disclosure Bulletin, TDB–AC–C–NO:NA9209119, vol. 35, p. 119.*

* cited by examiner

Primary Examiner—Jeffery Brier
(74) Attorney, Agent, or Firm—Edwards & Angell, LLP; David G. Conlin; Howard M. Gitten

(57) ABSTRACT

In an information presentation apparatus, a documents parser reads out and analyzes desired document data from a documents storage unit to obtain attributes data of the document data, which is stored in a document attributes storage uni. A displaying attributes setting unit uses the document attribute information, or attributes data, stored in the document attributes storage unit to retrieve data from tables of document attributes and displaying attributes, and, based on the retrieval result, sets a displaying attribute for the relevant document data. A displaying data generator determines a displaying manner of the document data according to the displaying attribute thus set, and the document data is displayed on a displaying unit in the determined manner. Accordingly, a user can quickly estimate a document attribute suggested by the content of the document data, not by reading the document data, but only at a glance of the manner in which the document data is being displayed. This allows easy comprehension of the content.

28 Claims, 31 Drawing Sheets

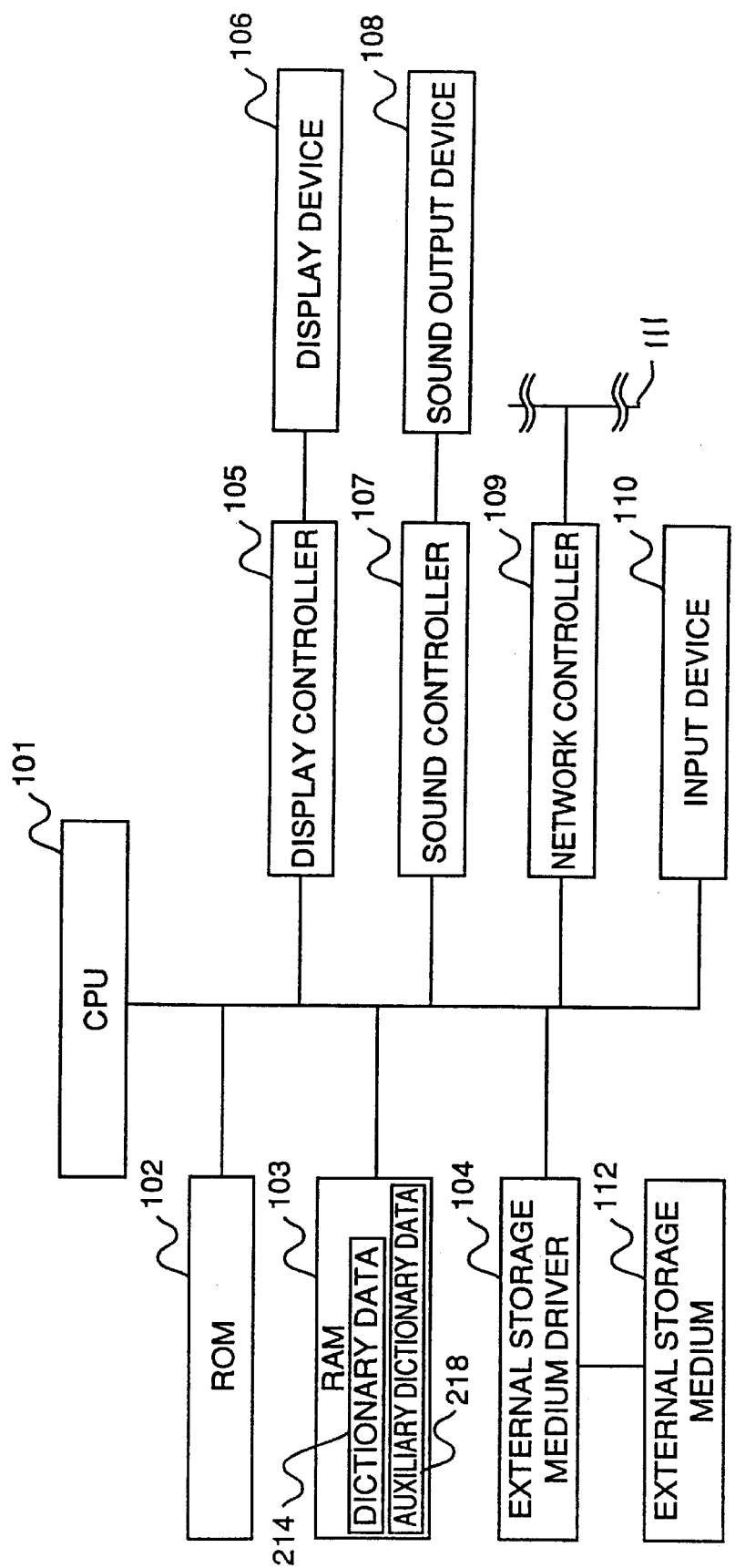

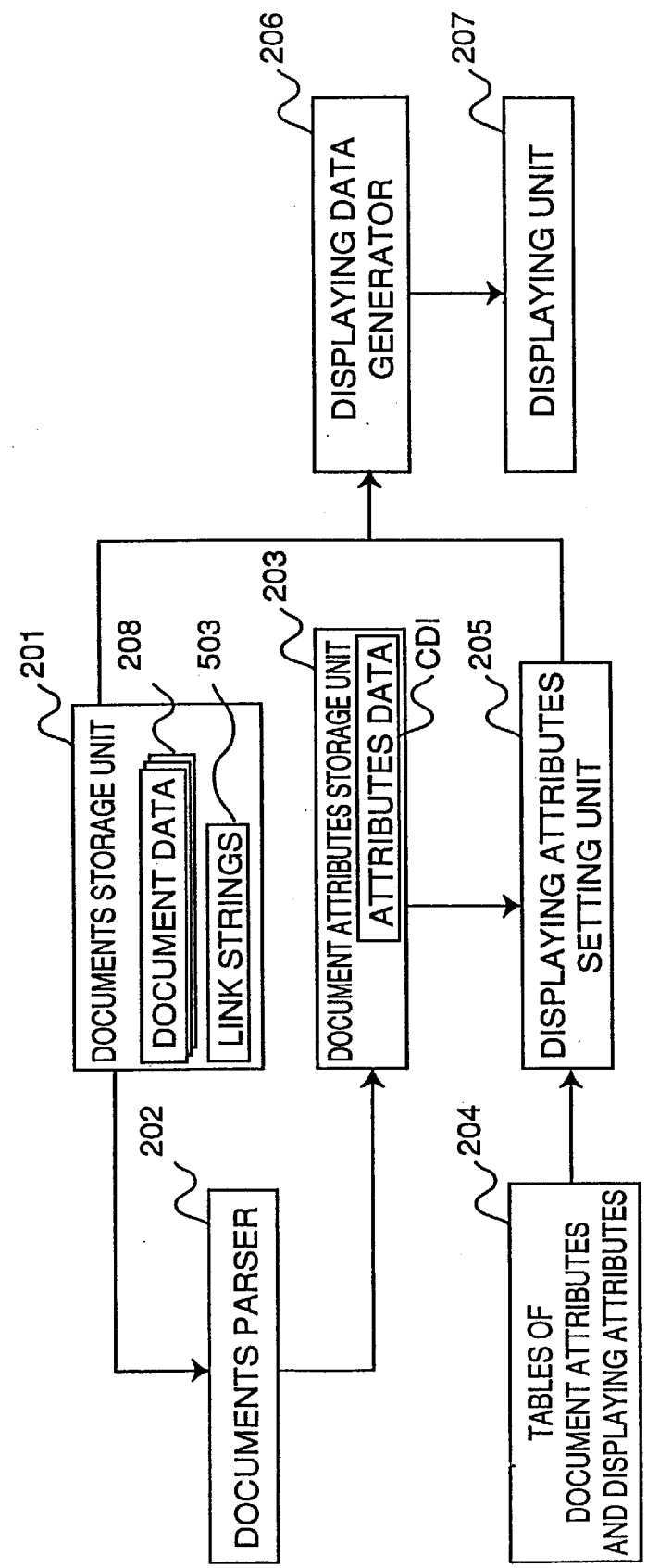

301 〜 <title> トキのひな、誕生秒読み </title> ←302
　　　　　　　　　　　　　　　　304
303 〜 <category> 社会 </category> ←306
305 〜 <date> 1999年5月21日 8時46分 </date>
307 〜 <body>
新潟県新穂村の佐渡トキ保護センターで、ふ化の前兆行動を続けるヤンヤン（洋洋）のひなは21日も卵の中で嗚き声を上げたり、殻を割ろうとはしけち打ち秒読みに入った。国内で初めてのトキ繁殖によるトキ二世誕生は秒読みに入っており、徹夜で見守った職員らの緊張も高まっている。

この卵は4月24日に産まれたとみられ、4月28日に人工ふ卵器に移された。20日朝から、ひなは卵の殻をくちばしで割ろうとしており、順調に行けば21日午前にふ化する。

308 〜 </body>
309 〜 <imp> 通常 </imp> 〜 310
311 〜 <ref> なし </ref> 〜 312

FIG. 4A

| CD1 | AT1 |
|---|---|
| CATEGORY | FONT |
| HEADLINE<br>SOCIETY<br>ECONOMICS<br>SPORTS<br>EDITORIAL | "MINCHO"<br>GOTHIC<br>"KAISHO"<br>"KANTEIRYU"<br>"GYOUSHO" |

| CD2 | AT2 |
|---|---|
| IMPORTANCE | TYPE |
| HIGH<br>MIDDLE<br>LOW | BOLD<br>NORMAL<br>SLANT |

| CD3 | AT3 |
|---|---|
| DATE | COLOR |
| WITHIN ONE HOUR<br>TODAY<br>WITHIN ONE WEEK<br>BEFORE ONE WEEK | RED<br>BLUE<br>GREEN<br>BLACK |

| CD4 | AT4 |
|---|---|
| REFERRED TO ? | SHADOW |
| YES<br>NO | NORMAL<br>SHADOWED |

<a href="file:/data/news/990521_1.xml">トキのひな、誕生秒読み</a>

| 211: WORDS | 212: TYPES DATA | 213: WEIGHTS DATA |
|---|---|---|
| 新潟県 | PROPER NOUN | 0.1 |
| 新穂村 | PROPER NOUN | 0.1 |
| 佐渡 | PROPER NOUN | 0.1 |
| トキ | NOUN | 0.8 |
| 保護 | "SAHEN" NOUN | 0.2 |
| センター | NOUN | 0.1 |
| ふ化 | "SAHEN" NOUN | 0.3 |
| 前兆 | NOUN | 0.1 |
| 行動 | "SAHEN" NOUN | 0.1 |
| 続ける | VERB | 0.1 |
| ヤンヤン | UNDEFINED | 0.3 |
| ⋮ | ⋮ | ⋮ |

FIG. 9

| 215: INDEX WORD | CULTURE | ART | HOBBY | LIFE | EDUCATION | HEALTH | SCIENCE | SOCIETY | ... | POLITICS | ECONOMICS |
|---|---|---|---|---|---|---|---|---|---|---|---|
| 新潟県 | 0.1 | 0.1 | 0.1 | 0.0 | 0.0 | 0.0 | 0.0 | 0.1 | ... | 0.1 | 0.1 |
| 佐渡 | 0.2 | 0.2 | 0.1 | 0.0 | 0.0 | 0.0 | 0.0 | 0.1 | ... | 0.1 | 0.1 |
| トキ | 0.2 | 0.1 | 0.0 | 0.0 | 0.0 | 0.1 | 0.3 | 0.1 | ... | 0.0 | 0.0 |
| 保護 | 0.3 | 0.3 | 0.0 | 0.2 | 0.2 | 0.1 | 0.2 | 0.3 | ... | 0.0 | 0.2 |
| センター | 0.3 | 0.1 | 0.0 | 0.0 | 0.1 | 0.0 | 0.1 | 0.1 | ... | 0.0 | 0.2 |
| ふ化 | 0.0 | 0.0 | 0.0 | 0.0 | 0.0 | 0.1 | 1.0 | 0.0 | ... | 0.0 | 0.0 |
| 前兆 | 0.1 | ... | ... | 0.1 | 0.1 | 0.1 | 0.1 | 0.1 | ... | 0.1 | 0.1 |
| ... | | | | | | | | | | | |

FIG. 10

| 219: INDEX WORD | CULTURE | ART | HOBBY | LIFE | ... | EDUCATION | HEALTH | SCIENCE | SOCIETY | ... | POLITICS | ECONOMICS |
|---|---|---|---|---|---|---|---|---|---|---|---|---|
| トキ | 0.1 | 0.0 | 0.0 | 0.0 | | 0.0 | 0.0 | 0.3 | 1.0 | | 0.0 | 0.0 |
| ヤンヤン | 0.0 | 0.0 | 0.0 | 0.0 | | 0.0 | 0.0 | 0.0 | 1.0 | | 0.0 | 0.0 |
| 小渕 | 0.0 | 0.0 | 0.0 | 0.0 | | 0.0 | 0.0 | 0.0 | 0.5 | | 1.0 | 0.5 |
| コンボ | 0.0 | 0.0 | 0.0 | 0.0 | | 0.0 | 0.0 | 0.0 | 0.0 | | 1.0 | 0.1 |
| .... | .... | .... | .... | .... | | .... | .... | .... | .... | | .... | .... |

FIG. 19

| | MHK | 毎朝テレビ | XYZテレビ | 近畿テレビ |
|---|---|---|---|---|
| 19時 | :00 7時のニュース 今日のニュース/スポーツ/コーナー内外の話題/他 | :00 あまから通り 「いい店/味/店/市外のできる店vs明石清介/他 | :00 怒りん坊将軍 「吉宗の正体は米将軍」梅平健 他 | :00 写幼体験中 グランブル 地知企画押す！上田にらないけ 井上スター初子 ねな館ブラウン 上野伯入名店 上の味の張本 高にらて名店名 等名で番組放送 |
| 20時 | :00 コメディ上方 せ 「商売繁盛で世もってこい」 | :00 沙雲電 メッセンジャー ひラクソヘンヤモ 他 | :00 サスペンス劇場 「京都・C級グル メ殺人事件」 海村ミサ原作/ 京の味は王将と 天下一品/犯 人は俺だ/他 | |
| 21時 | :00 クローズアップ近代 泥酔するなコピー 商品を偽イクラ にゃまさせいるな | :00 橋口ドラマ 「渡る世間は卯いて渡れ」 泉キリ子/他 | | :00 日本の料理 うしいティッシュ ないよのがい 飲みは止め...  |

716: NAMES OF BROADCASTING STATIONS
717: HOUR

FIG. 20

| 719: ATTRIBUTES | 720: BACKGROUND COLOR |
|---|---|
| NEWS |  |
| COOKING |  |
| DRAMA |  |
| DOCUMENTARY |  |
| MUSIC |  |
| VARIETY SHOW |  |

FIG. 21

| 717: HOUR / 716: NAMES OF BROADCASTING STATIONS | MHK | 毎朝テレビ | XYZテレビ | 近畿テレビ |
|---|---|---|---|---|
| 15 | | | | |
| 16 | | | | |
| 17 | | | | |
| 18 | | | | |
| 19 | | | | |
| 20 | | | | |
| 21 | | | | |
| 22 | | | | |
| 23 | | | | |
| 24 | | | | |

717: HOUR
716: NAMES OF BROADCASTING STATIONS

| | MHK | 毎朝テレビ | XYZテレビ | 近畿テレビ |
|---|---|---|---|---|
| 19時 | 00 7時のニュース 今日のニュース/スポーツ/ソウガイ(内外)/話題/他 | 00 あまから横丁「一鍋」手料理のできる店主 VS 朝日荘連中/他 | 00 怒りん坊問答「皆怒の圧倒」怪談御殿「御甲巳」他 | 00 芸能体験ツアー グラフタブル 特別企画コーナ「いぬ知でも出来」 掘ノダ初や名物ブラ「一緒のあまく合合解」都の味を紀 上方の味・港屋 話題の電卓販売 名古屋で楽し他 |
| 20時 | 00 コメディ上方でつ「商売繁盛で世もってこい」 | 00 気楽亭 朝市なくなさる風王子 アクション・チョ対決/他 | 00 サスペンス劇場 「京都・C級グル メ殺人事件」 海村ミサ原作/ 京の味は王将と 天下一品/記 人は俺だ/他 | |
| 21時 | 00 クローズアップ 近代 泥濃すろコピー 商品/偽バイカラ に村柱されるか | 00 橋口ドラマ 「渡る世間は鬼 いて渡れ」 泉キリチ/他 | | 00 日本の誰題 吹もし(リラシ)は「飯冷や止めいかシリ 目か?」 |

C2 ← 20時 MHK cell
C4 ← 20時 毎朝テレビ cell
C3 ← 近畿テレビ column
C1 → 20時 XYZテレビ cell
718: → (bottom right region)

FIG. 23

| | MHK | 毎朝テレビ | XYZテレビ | 近畿テレビ |
|---|---|---|---|---|
| 19時 | 00 7時のニュース 今日のローカル ニュース/スポーツ /サニー内外の 話題/他 | 00 あまりのいい湯「○○温泉」 | 00 怒りんぼう将軍「昔景の国の区会」(最終回) 他 | 00 学級体験コーナークイズバラ体育企画上等 |
| 20時 | 00 コメディ上方で「商売繁盛でで笹もってこい」 | | | |
| 21時 | 00 クローズアップ 近代 泥棒するコピー 商品/偽ブラ にだまされる | 00 | 00 | |

716: NAMES OF BROADCASTING STATIONS
717: HOUR

怒りんぼう将軍
最終回
「吉宗の正体は米将軍」

主演:梅平健

あらすじ
怒りんぼう将軍とあだなされる吉
宗の正体であったが、享保の改革を断
行したために米将軍と呼ばれ
るようになってしまった...

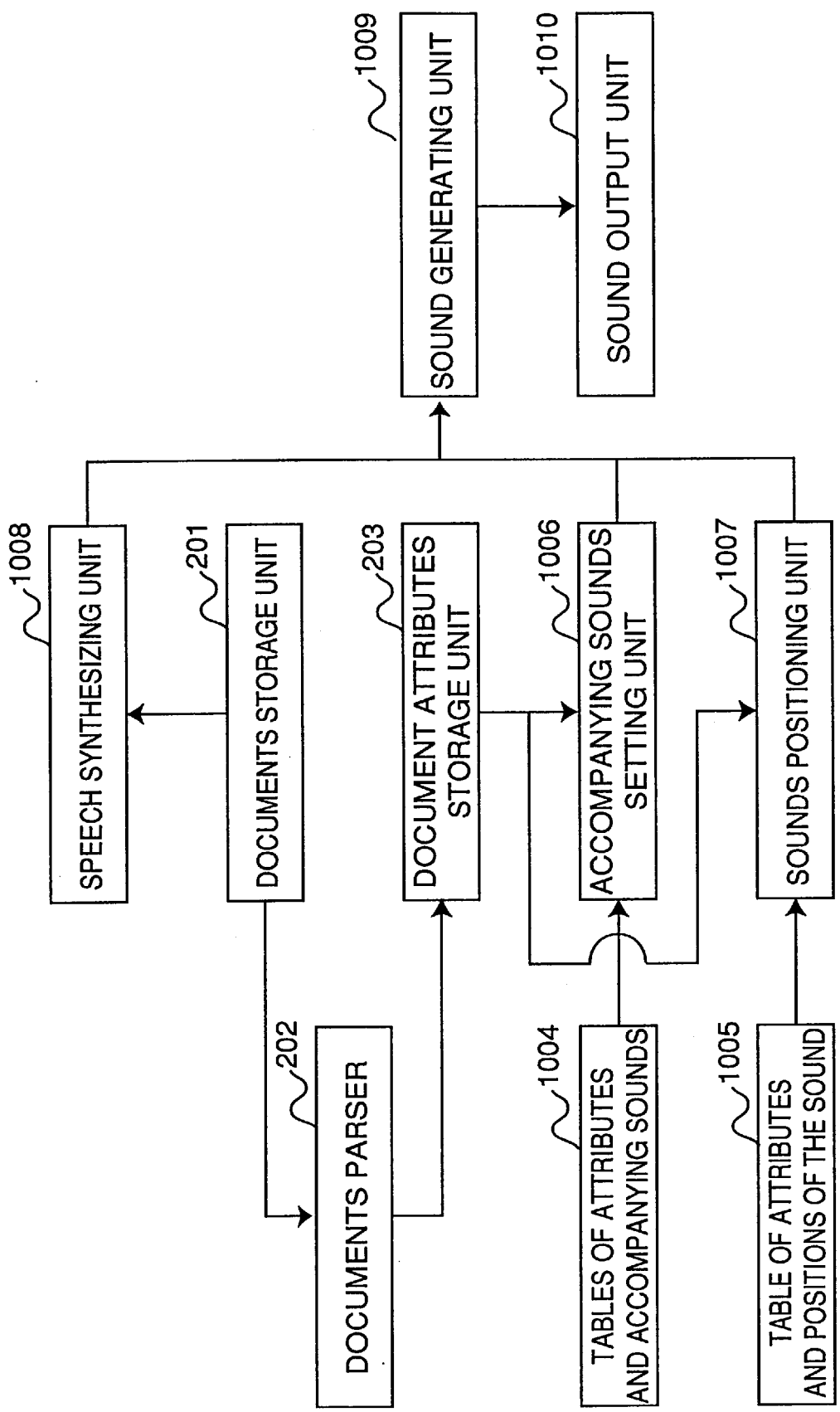

FIG. 27A

| CATEGORY (CD1) | MELODY (AT5) |
|---|---|
| HEADLINE | C, D, E, D, C |
| SOCIETY | C, E, G, E, C |
| ECONOMICS | G, F, E, D, C |
| SPORTS | E, C, E, C, E |
| EDITORIAL | G, A, G, E, G |

| IMPORTANCE (CD2) | TONE (AT6) |
|---|---|
| HIGH | GUITAR |
| MIDDLE | PIANO |
| LOW | FLUTE |

| DATE (CD3) | TEMPO (AT7) |
|---|---|
| WITHIN ONE HOUR | 90 bpm |
| TODAY | 120 bpm |
| WITHIN ONE WEEK | 150 bpm |
| BEFORE ONE WEEK | 180 bpm |

TB7

METHOD AND APPARATUS FOR PRESENTING INFORMATION IN ACCORDANCE WITH PRESENTATION ATTRIBUTE INFORMATION TO CONTROL PRESENTATION THEREOF

BACKGROUND OF THE INVENTION

1. Field of the Invention

The present invention relates to apparatuses and methods for information presentation, and computer readable recording media having information presentation programs recorded therein, and more particularly, to information presentation apparatus and method that change a way of presenting document information according to its attributes so as to present contents of the document information in a readily comprehensible manner, and a computer readable recording medium recording therein an information presentation program for execution of the method above.

2. Description of the Background Art

As digitalization of information advances, various kinds of document data including news articles have become available. These document data may be presented on a computer display, an electric bulletin board or the like, whose contents users can read. The contents of the document data may also be vocalized, which users can listen to through mobile telephones or the like. If the document data are being displayed, however, the users should read the data to confirm their contents. Likewise, if the document data are being vocalized, the users should carefully listen to them to confirm the contents. Thus, with a huge amount of document data, it has been difficult to readily determine which portion of the document data would contain necessary or important information.

An information processing apparatus has been disclosed in Japanese Patent Laying-Open No. 9-190438 to solve such problems. In this information processing apparatus, document data is divided into a plurality of words, and additional information is applied to each word. Displaying attributes, such as color and size of letters, are changed for each word according to the additional information applied thereto, and the entire document data is displayed. The contents of the document data on display thus become readily comprehensible.

With such an information processing apparatus as disclosed in Japanese Patent Laying-Open No. 9-190438, however, the displaying attributes are changed on a word-to-word basis, which will make the entire display discursive. It is still difficult to comprehend the contents of the entire document since each word should be confirmed. As the displaying attributes of a document are partially changed (on a word to word basis), readability of the document is degraded. Further, this method exhibits no effects when the document data is being displayed with scrolling as in the electric bulletin board or displayed with switching a part of the document data. Further, if the document data includes a hyperlink as in the HyperText Markup Language (HTML) document, displaying attributes of the link are determined according to the word itself that represents the link; they do not reflect the content of another document data linked thereto.

SUMMARY OF THE INVENTION

An object of the present invention is to provide information presentation apparatus and method that present document data in a manner that makes its content easy to comprehend. Another object of the present invention is to provide a computer readable recording medium recording therein an information presentation program for execution of the method above.

To achieve the above-described objects, the information presentation apparatus according to an aspect of the present invention includes: a storage unit that stores information including at least one document data; an output unit that has a displaying unit for externally outputting information; a displaying attribute determination unit that determines at least one kind of displaying attributes for outputting prescribed document data within the storage unit, based on prescribed information including document attribute information, or attribute data, showing a document attribute corresponding to a content being represented by the prescribed document data; and a display control unit that causes the displaying unit to display the prescribed document data according to the displaying attribute determined.

The information presentation method according to another aspect of the present invention to achieve the above-described objects includes: a displaying attribute determination step for determining at least one kind of displaying attributes for outputting prescribed document data, based on prescribed information including document attribute information, or attribute data, showing a document attribute corresponding to a content being indicated by the prescribed document data; and a displaying step for displaying the prescribed document data according to the displaying attribute determined.

To achieve the above-described objects, in the computer readable recording medium having an information presentation program recorded therein according to a further aspect of the present invention, the information presentation program is provided to allow a computer to execute an information presentation method, wherein the information presentation method includes: a displaying attribute determination step for determining at least one kind of displaying attributes for outputting prescribed document data, based on prescribed information including document attribute information, or attribute data, showing a document attribute corresponding to a content being indicated by the prescribed document data; and a displaying step for displaying the prescribed document data according to the displaying attribute determined.

According to the information presentation apparatus, method and program as described above, the displaying attribute for output of the prescribed document data is determined based on the document attribute of the document data, and the document data is displayed according to the displaying attribute thus determined. Therefore, the content of the document data can be comprehended by simply glancing at the document on display.

In the above-described information presentation apparatus, if at least two document data are related to each other by a link, at least one link string representing such link is further stored in the storage unit. The displaying attribute determination unit has a link attribute determination unit that determines at least one kind of displaying attributes of prescribed link string within the storage unit, based on prescribed information of the document data that is linked with and designated by the prescribed link string. The display control unit has a link display control unit that causes the displaying unit to display the prescribed link string according to the displaying attribute determined.

Accordingly, the link string representing a link, such as a hyperlink, is displayed according to the displaying attribute determined based on the document attribute of the document data that is linked with and designated by the link string. Thus, it is possible to comprehend, before following the link, the content of the document data designated by the link string, from the manner in which the link string is being displayed.

Preferably, the information presentation apparatus further includes a document attribute extracting unit that analyzes prescribed document data to extract its document attribute. In this case, the document attribute of the prescribed document data can be obtained by analyzing the document data. Thus, it becomes readily possible to determine a displaying attribute corresponding to the content of the prescribed document data even if the document attribute is not set in advance for each document data.

Preferably, in the information presentation apparatus as described above, the prescribed information further includes user's preference information corresponding to each document attribute. In this case, the displaying attribute is determined according to the degree of user's preference with respect to each document attribute of the prescribed document data, so that it becomes possible to efficiently locate and display document data that will attract the user's interest.

In the information presentation apparatus as described above, the user's preference information is preferably determined based of information showing how often prescribed document data has been displayed and referred to. Thus, the user's preference is extracted from user's reference histories of document data, so that it is unnecessary for a user to preset any document attribute that he/she is interested in.

In the information presentation apparatus as described above, the displaying attribute determination unit preferably includes a table in which at least one kind of document attributes is related to at least one kind of displaying attributes, and a retrieval unit that retrieves from the table a displaying attribute corresponding to prescribed document data. The displaying attribute is thus determined by retrieving data from the table correlating document attributes of document data to displaying attributes therefor. Accordingly, by updating the contents of the table in real time, even if different document data having the same document attribute are being displayed successively, it becomes readily possible to display the different document data with different displaying attributes to distinguish therebetween.

In the information presentation apparatus as described above, the displaying attribute determination unit preferably calculates and determines the displaying attribute based on the document attribute of the prescribed document data. Thus, it becomes possible to correlate a document attribute represented by continuous quantity, such as the time when the document was created, to a displaying attribute represented by continuous quantity, such as the size of letters on display.

In the information presentation apparatus as described above, the at least one kind of displaying attributes preferably includes a font of letters for display. Thus, a document attribute of document data is represented by the font of letters, so that it becomes possible to comprehend the content of prescribed document data by intuition (at a glance).

In the information presentation apparatus as described above, the at least one kind of displaying attributes preferably includes a displaying color of information. A document attribute of prescribed document data is explicitly represented by the displaying color. Thus, even if the prescribed data is displayed in small letters almost illegible, it becomes readily possible to comprehend the content of the document data on display from its displaying color.

In the information presentation apparatus as described above, when information is caused to move on a display of the displaying unit while being displayed, the at least one kind of displaying attributes preferably includes a pattern of its movement. A document attribute of prescribed document data can thus be represented by the pattern of its movement. Specifically, different positions on display may be assigned to different document attributes for starting the movement of document data. In this case, all that is needed for obtaining document data having a desired document attribute is to closely observe a particular starting position assigned to the attribute. Therefore, it becomes possible for a user to readily select and confirm desired document data.

In the information presentation apparatus as described above, the at least one kind of displaying attributes is preferably determined by an outputting manner that can be implemented by the output unit. Thus, even if the output unit including the displaying unit is an unspecified one such as the one connected to a network, the displaying attribute can be selected to conform to the capability of the output unit.

In the information presentation apparatus as described above, preferably, the output unit further has a sound output unit for outputting sound, and the information presentation apparatus further includes a sound control unit that causes the sound output unit to output prescribed sound corresponding to a document attribute of prescribed document data in synchronization with display of the prescribed document data. As the sound corresponding to a document attribute of prescribed document data is thus output in synchronization with display of the document data, even if an electric bulletin board or the like is employed as the displaying unit, oversight of the document data on display is avoided.

In the information presentation apparatus as described above, prescribed document data is preferably output as speech sound from the sound output unit in synchronization with prescribed sound. As prescribed document data is thus output as speech sound, it becomes possible to know the content of the document data only by listening to the sound.

Preferably, the information presentation apparatus as described above further has a select unit for selecting a prescribed link string from at least one link string, and the information presentation apparatus further includes a sound control unit, responsive to the prescribed link string being selected, for causing the sound output unit to output prescribed sound corresponding to the document attribute of the prescribed document data that is linked with and designated by the link string. Thus, when a link string is selected, sound corresponding to a document attribute of prescribed document data that is linked with and designated by the relevant link string is output, so that it becomes possible to confirm the content of the document data designated by the link string by the sound.

In the information presentation apparatus as described above, the sound control unit preferably includes a positioning unit that positions the sound being output from the sound output unit based on a document attribute of prescribed document data. As the position where the sound is to be positioned changes corresponding to the document attribute of the prescribed document data, it becomes readily possible to associate a direction from which the sound is originated, with the content of the document data being output.

In the information presentation apparatus as described above, various kinds of information related to prescribed document data are preferably output via the output unit in synchronization with display of the prescribed document data. Thus, various kinds of information concerning prescribed document data, including image, motion picture and sound, are displayed or output in relation to the prescribed document data. This allows more accurate comprehension of the content of the document data.

In the storage unit as described above, the link string may be stored separately from document data, or alternatively, the link string may be included within the document data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block configuration diagram of an information presentation apparatus according to first and second embodiments of the present invention.

FIG. 2A is a block diagram showing a functional configuration of the information presentation apparatus of FIG. 1.

FIG. 3 illustrates an example of document data 208.

FIGS. 4A–4D illustrate, by way of example, tables of document attributes and displaying attributes.

FIGS. 6A–6F illustrate document data displayed on an electric bulletin board with scrolling, according to the first embodiment.

FIGS. 7A and 7B illustrate document data 209 according to the second embodiment.

FIG. 8 is a table showing a result of morpheme analysis of the document data shown in FIG. 7B.

FIG. 9 shows, by way of example, contents of dictionary data 214 in FIG. 1.

FIG. 10 shows, by way of example, contents of auxiliary dictionary data 218 in FIG. 1.

FIG. 19 illustrates an example of program information display in the displaying unit in FIG. 18.

FIG. 20 is a table showing document attributes of program data and background colors corresponding thereto according to the third embodiment.

FIG. 21 illustrates a modification of the program information display shown in FIG. 19, in which respective rows in a direction of broadcasting hours are narrowed such that a larger amount of program data can be viewed within the same display size.

FIG. 22 illustrates a further display example of program data that is based on current time information and reference history information within a reference histories storage unit in FIG. 18.

FIG. 23 illustrates a still further display example of program data shown in FIG. 19 with detailed information being additionally displayed for arbitrary program data.

FIG. 26A is a block diagram showing a configuration of an information presentation apparatus according to yet another embodiment of the present invention.

FIGS. 27A–27C are tables showing document attributes and accompanying sounds corresponding thereto.

DESCRIPTION OF THE PREFERRED EMBODIMENTS

Figure 2B:
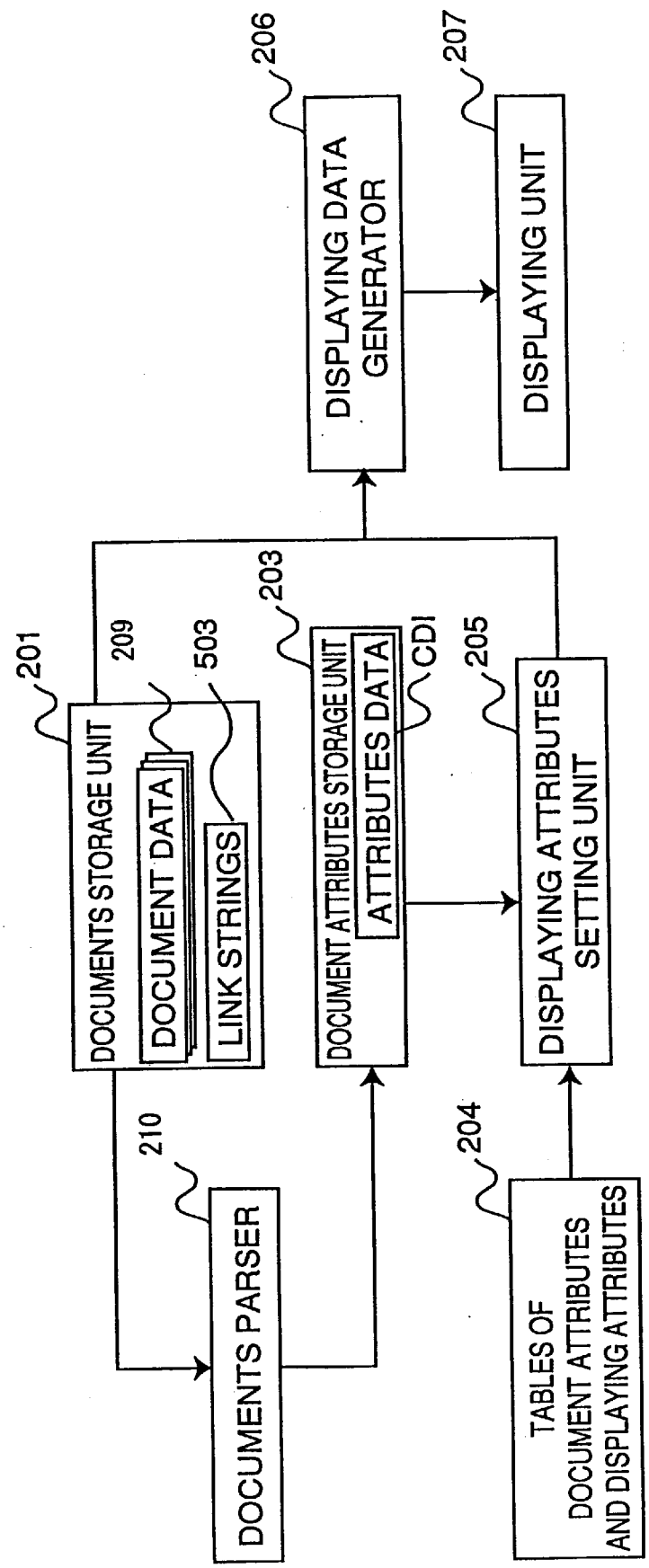
FIG. 2B is a block diagram showing a functional configuration of the information presentation apparatus of FIG. 1 in accordance with a second embodiment.

Hereinafter, embodiments of the present invention will be described with reference to the accompanying drawings. Herein, attributes data of document data refer to document attributes corresponding to the contents being represented by the document data. For the purposes of simplification, the documents corresponding to the document data are not translated into English, but presented in Japanese as they are.

First Embodiment

The first embodiment of the present invention will now be described.

FIG. 1 is a block diagram showing a configuration of an information presentation apparatus according to the first and second embodiments of the present invention. In FIG. 1, the information presentation apparatus has a configuration common in general computers, which includes: a central processing unit (CPU) 101; a read only memory (ROM) 102 storing various programs and various data; a random access memory (RAM) 103 storing various data including dictionary data 214 and auxiliary dictionary data 218 that will be described later; an external storage medium driver 104 for accessing an external storage medium 112 set thereto; a display device 106 for externally displaying data and a display controller 105 for control thereof; a sound output device 108 for externally outputting sound and a sound controller 107 for control thereof; a network controller 109 for connecting the apparatus to various communication networks 111 including the Internet; and an input device 110 externally manipulated for inputting external data.

CPU 101 controls and manages operations of the entire apparatus. Display controller 105 manages displaying contents that are generated by CPU 101 by processing the data stored in ROM 102, RAM 103 and external storage medium 112, and displays the contents on display device 106. Display device 106 may include cathode ray tube (CRT), liquid crystal display, light emitting diode (LED) or the like. Sound controller 107 manages sound data that are generated by CPU 101 by processing the data prestored in ROM 102, RAM 103 and external storage medium 112, and outputs the sound data via sound output device 108. Sound output device 108 may include speaker, headphone or the like. Network controller 109 is modem, Transmission Control Protocol/Internet Protocol (TCP/IP) controller or the like, which inputs/outputs data via various communication networks 111 including the Internet. Input device 110 may include keyboard, mouse or the like.

FIG. 2A is a block diagram showing a functional configuration of the information presentation apparatus shown in FIG. 1. Referring to FIG. 2A, the information presentation apparatus includes a documents storage unit 201, a documents parser 202, a document attributes storage unit 203, tables of document attributes and displaying attributes 204, a displaying attributes setting unit 205, and a displaying data generator 206 and a displaying unit 207 that correspond to display device 106.

Documents storage unit 201 stores a plurality of document data 208, as well as link strings 503 of hyperlink for respective document data 209 as will be described later. The document data being stored in documents storage unit 201 may be data permanently stored in ROM 102, RAM 103 and external storage medium 112, or may be data received from external communication networks 111 via network controller 109. Document data 208 being stored in documents storage unit 201 may be normal text data, or may be data having attributes data added thereto by markup languages such as standard generalized markup language (SGML), extensible markup language (XML) or the like.

Link strings 503 need not be stored separately from document data 209. For example, information identifying which string in document data 209 is the link string 503 may be stored. Specifically, as in HTML document (WWW page), a particular string in the document may include information allowing its link to another document.

Documents parser 202 analyzes document data 208 stored in documents storage unit 201 and calculates document attributes of document data 208. If document data 208 has attributes data added thereto by a markup language such as SGML, HTML or XML, such attributes data can be utilized for the analysis.

FIG. 3 shows an example of document data 208. Respective partial data in document data 208 are provided with various tags indicating their contents. For example, as shown in FIG. 3, the part indicating a title of document data 208 is provided with <title> tag 301 and </title> tag 302 to indicate that the corresponding partial data represents the title. The part indicating a category of the contents of document data 208 is provided with <category> tag 303 and </category> tag 304 to indicate that the corresponding partial data represents the category. The part indicating the time at which document data 208 was delivered is provided with <date> tag 305 and </date> tag 306 to indicate that the corresponding partial data represents the delivery time. The body part of document data 208 is provided with <body> tag 307 and </body> tag 308 to indicate that the corresponding partial data is the body. The part indicating the importance of document data 208 is provided with <imp> tag 309 and </imp> tag 310 to indicate that the corresponding partial data represents the importance. The part indicating a history of reference of document data 208 is provided with <ref> tag 311 and </ref> tag 312 to indicate that the corresponding partial data represent the reference history. Thus, document data 208 is described with its parts being identified by respective tags.

Therefore, documents parser 202 analyzes document data 208 as shown in FIG. 3 based on the data presented by the added tags to obtain attributes data thereof. Specifically, information that the document data 208 belongs, e.g., to a category of "society" and was delivered, e.g., at "8:46, May 21, 1999", is identified as the attributes data of the document data. Documents parser 202 obtains such attributes data of document data 208 by extracting the contents presented by the tags added within document data 208, obtains text data to be displayed by taking out the contents indicated by <title> tag 301, <body> tag 307 or the like, and stores those attributes data as attributes data CDI in document attributes storage unit 203.

Tables of document attributes and displaying attributes 204 include tables TBi (i=1, 2, 3, . . . ) each store, for at least one kind of attributes data CDI obtained from document data 208, correspondence between the document attributes data CDI and displaying attributes data ATI for identification of a displaying manner in displaying unit 207. Tables TB1–TB4 of document attributes and displaying attributes are shown in FIGS. 4A–4D by way of example. Referring to FIGS. 4A–4D, displaying attributes data ATi (AT1–AT4 respectively) indicating font, type, color of letters as well as presence/absence of shadow upon display are assigned corresponding to respective attributes data CD1–CD4 indicating category, importance, date of delivery and reference history being designated by tags 303–306, 309–310 within document data 208.

For example, assume that attributes data CDI obtained by analyzing document data 208 indicate that document data 208 belongs to a category of "society", the degree of its importance is "high", it was delivered "within one hour" and "has not been referred to". In this case, displaying attributes setting unit 205 retrieves data from tables TB1–TB4 of document attributes and displaying attributes based on those attributes data CDI, and reads out and sets corresponding displaying attributes data ATi.

Displaying data generator 206 refers to displaying attributes data ATi thus set, and performs control so that document data 208 is displayed on displaying unit 207 in Gothic, bold, red and shadowed.

The contents of each table TBi included in tables of document attributes and displaying attributes 204 need not be fixed; they can be modified according to a state of the system. For example, by setting the contents of the tables 204 based only on the displaying attributes that can be displayed on displaying unit 207, it becomes possible to flexibly arrange, e.g., such that color information is not to be used as displaying attributes data AT3 when display device 106 is a monochrome display.

Further, table TB1 of document attributes and displaying attributes may be prepared in which two or more displaying attributes data AT1 indicating different fonts are set for respective attributes data CD1 indicating categories. In this case, displaying attributes setting unit 205 may be configured such that the font to be used for display is switched in turn for every document data 208. Thus, even if a plurality of document data 208 in the same category are being displayed successively, the fonts of letters on display that are changed for respective document data 208 can distinguish between such document data.

Displaying data generator 206 processes document data 208 stored in documents storage unit 201 using at least one displaying attribute ATi set by displaying attributes setting unit 205, to generate contents to be displayed on displaying unit 207. The displaying contents generated by displaying data generator 206 are provided to and displayed on displaying unit 207.

Figure 5:
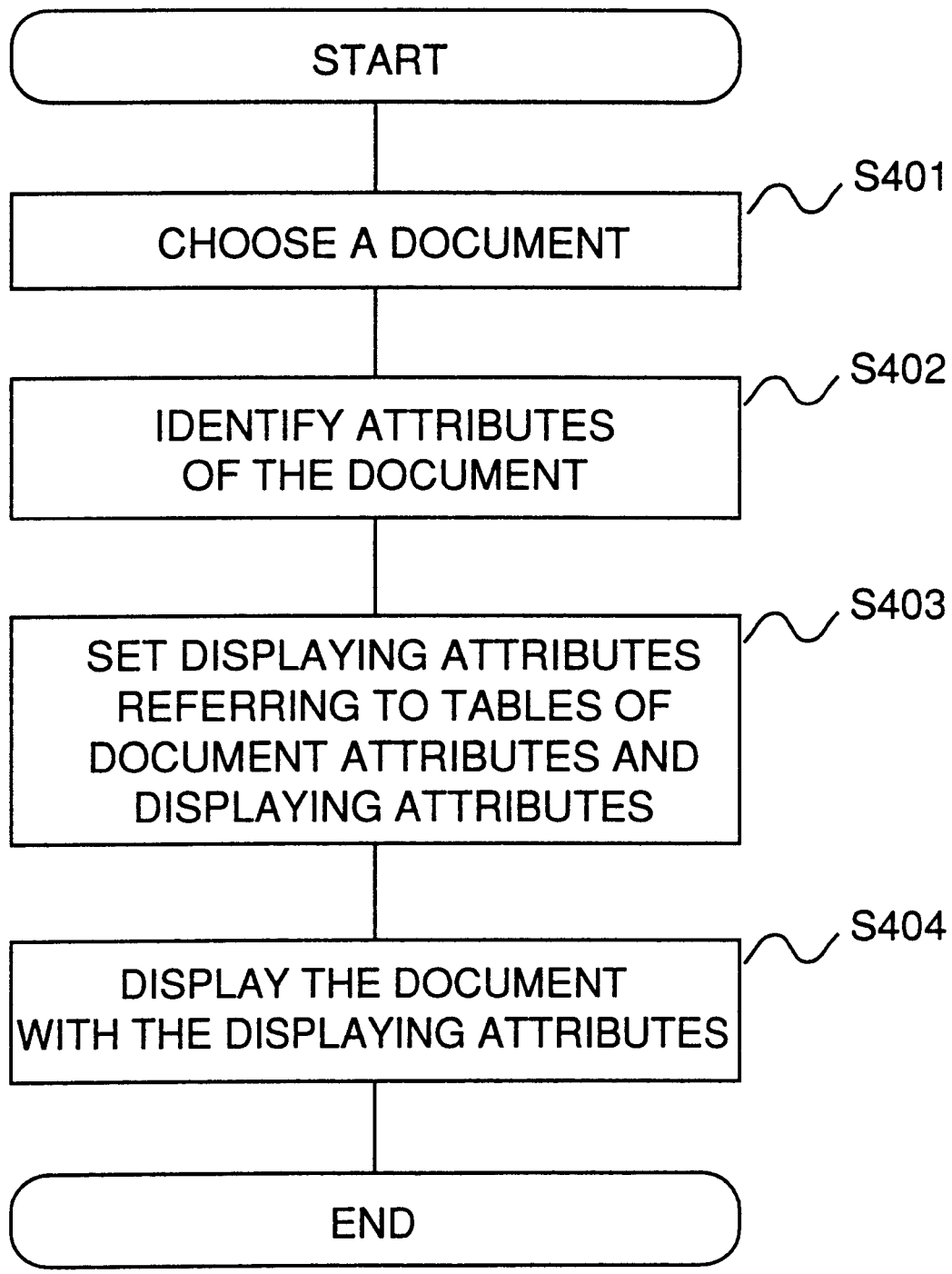
FIG. 5 is a schematic process flow chart according to the first embodiment of the information presentation apparatus of FIG. 1.

FIG. 5 is a schematic process flow chart according to the first embodiment of the information presentation apparatus shown in FIG. 1. Referring to FIG. 5, first, CPU 101 selectively reads out, from a plurality of document data 208 stored in documents storage unit 201, document data 208 to be displayed next (step S401). In this case, document data 208 to be read out may be chosen based on information regarding any order of the plurality of document data 208, e.g., the order in which the data arrived at documents storage unit 201, the order of the Japanese syllabary, or the order of importance, or any combination of these orders. It may also be chosen based on information concerning the states of the system, e.g., retrieval results or reference histories of document data 208, or even at random. If document data 208 are being received from communication networks 111, they may be chosen on a first-come-first-served basis.

Next, document data 208 thus read out is analyzed to identify attributes data CDI (step S402). The method of identification of attributes is as described above. Next, displaying attributes setting unit 205 uses the identified attributes data CDI to retrieve data from tables of document attributes and displaying attributes 204, and sets displaying attributes data ATi (step S403). Displaying data generator 206 and displaying unit 207 then display document data 208 chosen at step S404 in a displaying manner designated by displaying attributes data ATi set at step S403.

FIGS. 6A–6F illustrates examples of document data that are being displayed on an electric bulletin board with scrolling in the first embodiment. The electric bulletin board corresponds to display device 106 and displaying unit 207. Now suppose that document data 208 as shown in FIG. 6A is to be displayed on the bulletin board. Attributes data CDI of this document data 208 indicates that the category is "society", the degree of importance is "high", it was delivered "within one hour" and its reference history is "none". Data in tables of document attributes and displaying attributes 204 are retrieved based on such attributes data CDI, and thus, document data 208 is displayed in Gothic, in red and shadowed, on the electric bulletin board with scrolling. More specifically, the display starts as in FIG. 6B, with each letter presented by document data 208 being automatically scrolled on the bulletin board from right to left. In this example, an outline circle (O) is placed ahead of leading data of document data 208 as an indicator of the leading data.

Thereafter, while the scroll display continues as in FIG. 6C, the entire document data 208 is displayed according to the same displaying attributes ATi, so that a user can recognize the document attributes of document data 208 only at a glance of the displaying manner of data 208 on the electric bulletin board. Therefore, it is readily possible for the user to understand the contents presented by document data 208 even if he/she glances only at a portion thereof.

The scroll display further continues as in FIG. 6D, in which the same document data 208 is displayed twice in case the first one is missed. The displaying contents at the second time has been displayed once before, so that the reference history of document data 208, indicated by tags 311 and 312, is "yes". Therefore, based on the contents of table TB4 of document attributes and displaying attributes shown in FIG. 4D, document data 208 is displayed unshadowed at the second time.

As described above, document data 208 is displayed with its displaying manner being set. Therefore, even if the same document data 208 is displayed twice continuously with scrolling, it is quickly determined whether the current document on display is the first-time display or the second-time display from its displaying manner. Thus, if a user takes a glance at the latter part of the first-time display of document data 208, he/she can easily determine that the second-time data display will follow.

Further, assume that a next document data 208 as in FIG. 6E is to be displayed successively, and suppose that attributes data CDI obtained for this document data 208 indicate that the category is "sports", the degree of importance is "high", the message was delivered "today", and it "has been referred to before". Corresponding displaying attributes data ATi are identified by retrieving data from tables TB1–TB4 of document attributes and displaying attributes. Thus, the document data 208 of FIG. 6E is displayed in the font of "Kanteiryu", one of specific fonts used in Japanese, in the normal type of letters, in blue and unshadowed. Thus, by simply confirming the displaying manner of document data 208 at a glance, a user can readily recognize that the display has been switched to next document data 208.

Here, assume, as display device 106, an electric bulletin board for which a user is able to adjust the scroll speed. In this case, according to the first embodiment, the user can scroll a series of document data 208 at high speed, without reading them but only checking the attributes thereof. Once he/she confirms that an interesting document data 208 is being displayed from its displaying manner (shown by displaying attributes data AT3), the user can reduce the scroll speed to take time to read the contents of document data 208.

Second Embodiment

Hereinafter, the second embodiment of the present invention will be described, taking the case in which an electric bulletin board displaying letters of document data with scrolling is employed as display device 106. Here, it is assumed that each document data in documents storage unit 201 is hyperlinked, and a link string for reference to the document data linked thereto is being displayed with scrolling.

FIGS. 2B, 7A and 7B show link string 503 used to generate document data 209 according to the second embodiment. Document data 209 of FIG. 7B was generated utilizing the hyperlink. Link string 503 shown in FIG. 7A represents the hyperlink. More specifically, referring to FIG. 7A, a tag <a href="file:/data/news/990521_1.xml"> indicates that the link string 503 following the tag is linked to a file named /data/news/990521_1.xml, and the content of this file is presented by document data 209 as shown in FIG. 7B.

This document data 209 in FIG. 7B that is linked with link string 503 is not provided with attributes data as shown by tags 301–312 in FIG. 3. Thus, documents parser 210 analyzes document data 209 instead of utilizing tag information, to identify attributes data CDI. More specifically, documents parser 210 executes morpheme analysis of document data 209, for example, so that the document data 209 is divided into a plurality of words, information concerning the importance and the category is set for each word, and such information is integrated to evaluate the attributes data of document data 209. Another method, e.g., that disclosed in Japanese Patent Laying-Open No. 6-195388, may be utilized instead.

The results of the morpheme analysis of document data 209 of FIG. 7B are shown in a table in FIG. 8. From the morpheme analysis of document data 209, a plurality of words 211 as well as types data 212 indicating the parts of speech and weights data 213 indicating the weights of respective words 211 are obtained as shown in FIG. 8. Here, words 211 having types data 212 not affecting attributes of document data 209, e.g., articles, are omitted from the results of morpheme analysis. As seen from FIG. 8, the weight for each word 211, indicated as weights data 213, is set higher as the frequency of its appearance in document data 209 increases, and set lower as the frequency of its appearance in other document data 209 decreases.

Next, attributes of each word 211 are determined using dictionary data 214 registered in advance in RAM 103 of FIG. 1. FIG. 9 shows contents of dictionary data 214 of FIG. 1 by way of example. Referring to FIG. 9, a plurality of index words 215 and their degrees of relation 217j (j=1, 2, 3, ...) with respect to attributes 216i (i=1 to n), such as "culture", "art", "hobby", are set in dictionary data 214. Documents parser 210 retrieves dictionary data 214 of FIG. 9 based on respective words 211 in FIG. 8 to identify corresponding index words 215. It then multiplies the plurality of values representing the degrees of relation 217j for each identified index word 215 by weights data 213 of corresponding word 211, and obtains the sum of the multiplied results for every attribute 216i. As a result, according to which attribute 216i exhibits a great value throughout the entire document data 209, attributes data CDI of document data 209 can be obtained.

FIG. 10 shows contents of auxiliary dictionary data 218 of FIG. 1 by way of example. Auxiliary dictionary data 218, in which a plurality of keywords of current events are registered as index words 219, has its contents updated as necessary. Attributes data CDI of document data 209 such as news articles can be evaluated with accuracy by utilizing both dictionary data 214 and auxiliary dictionary data 218, referring to (or retrieving) auxiliary dictionary data 218 in preference to dictionary data 214.

In auxiliary dictionary data 218 of FIG. 10, "トキ (ibis; Nipponia Nippon)" (index word 219 in the first row) has the degrees of relation 220j (j=1, 2, 3, ...) set therefor, whose values are different from those set for the same word (index word 215 in the third row) in dictionary data 214 of FIG. 9. Auxiliary dictionary data 218 further includes the degrees of relation 220j that are set for undefined words such as "ヤンヤン (name of トキ)" (index word 219 of FIG. 10 in the second row) and for proper nouns such as "小渕 (name of president)" (index word 219 in the third row) and "コソボ (name of place)" (index word 219 in the fourth row). In the case where auxiliary dictionary data 218 are referred to in preference to dictionary data 214 for document data 209 of news articles, index word 219 having lost its news value may be deleted from auxiliary dictionary data 218, or if the word 219 has become the focus of attention in another field (or another attribute 216i), corresponding degree of relation 220j can be changed. Thus, documents parser 210 can analyze document data 209 and obtain its attributes data CDI from calculation.

Figure 11:
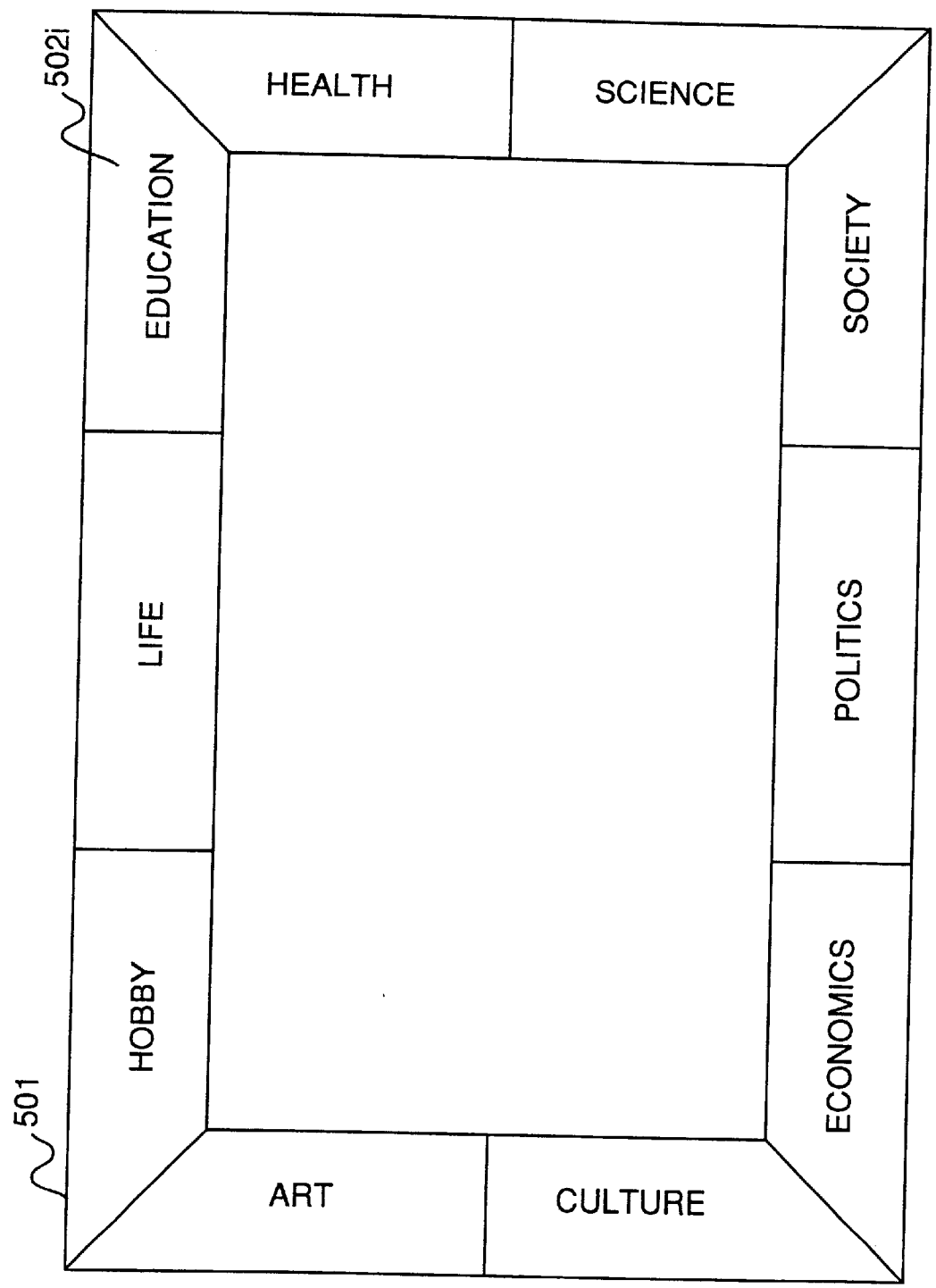
FIG. 11 illustrates displaying regions and corresponding document attributes of document data on a display according to the second embodiment.
Figure 12:
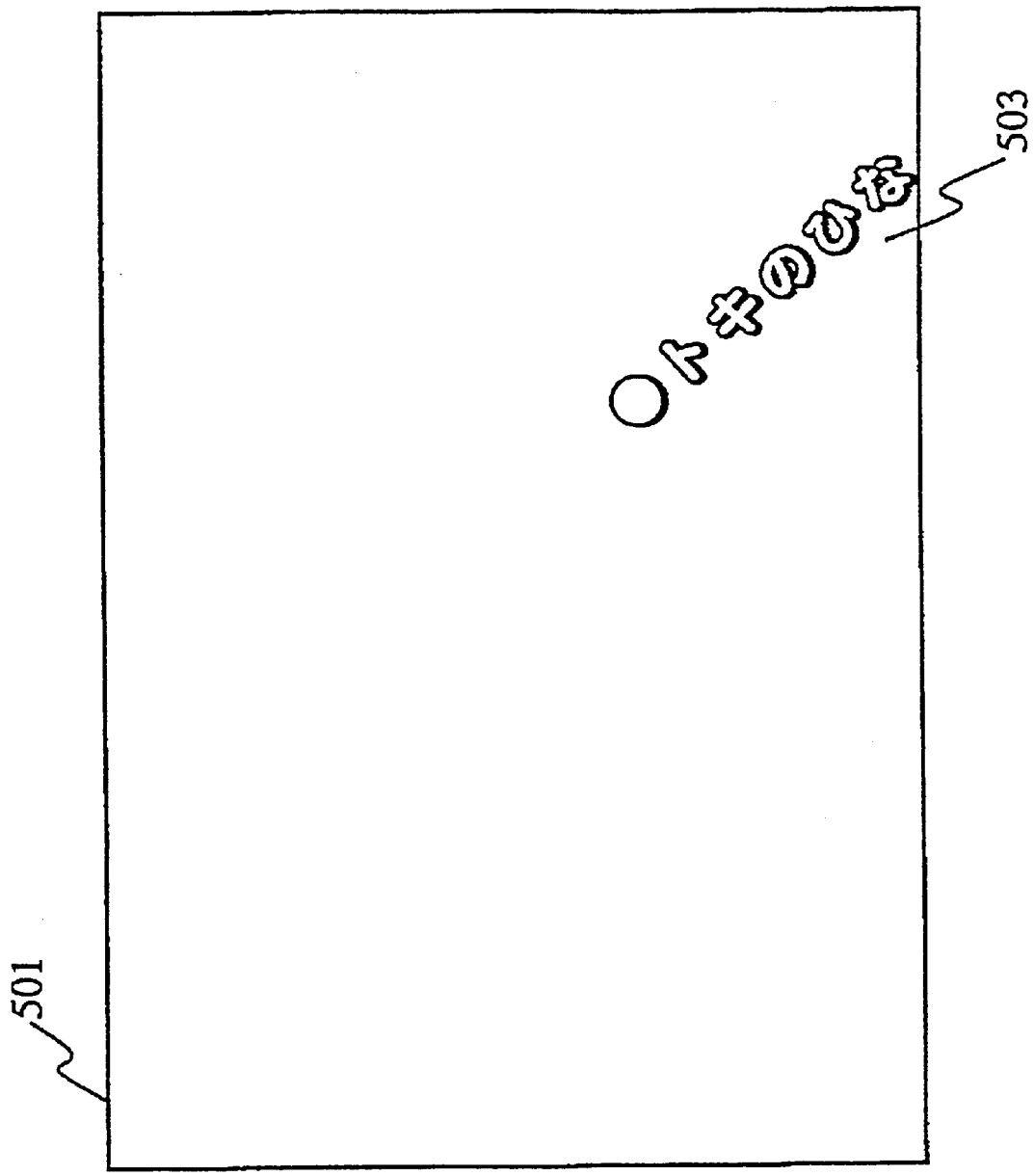
FIGS. 12–15 illustrate a link string moving on the display of FIG. 11.
Figure 13:
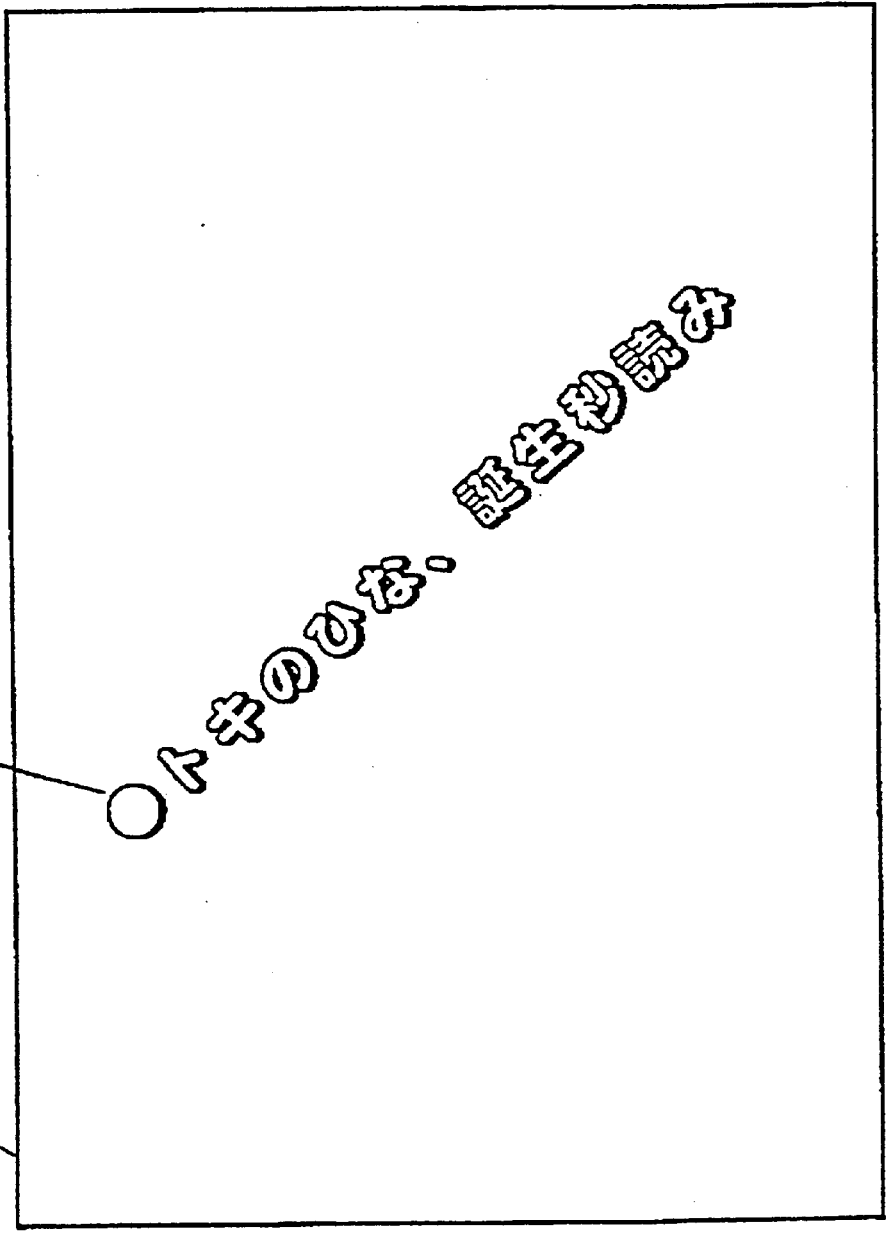
Figure 14:
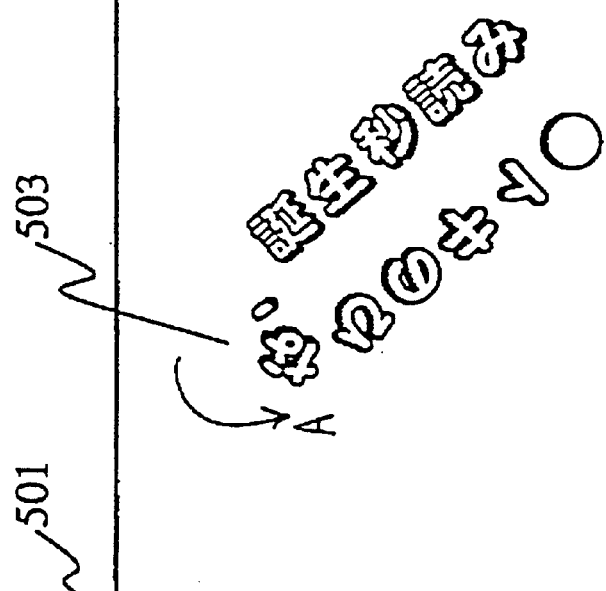
Figure 15:
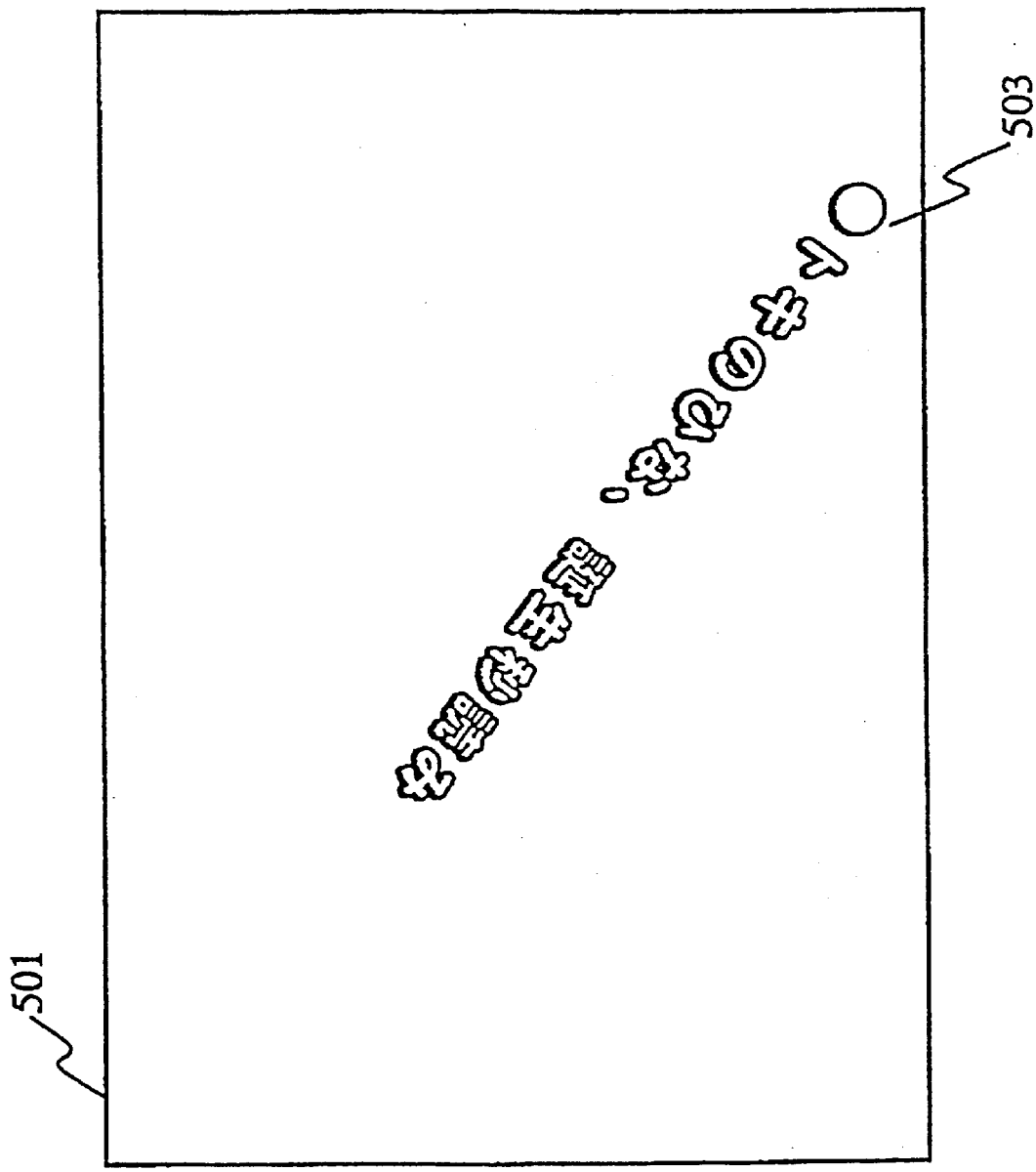

Referring to FIGS. 11–16, display examples of document data 209 according to the second embodiment will be described. FIG. 11 illustrates display regions 501 and corresponding document attributes of document data 209 in the second embodiment. Referring to FIG. 11, the peripheral region surrounding a rectangular displaying region 501 of display device 106 in FIG. 1 are divided into a plurality of attribute regions 502i that correspond to respective document attributes 216i of document data 209. Link string 503 of FIG. 7A is displayed such that it appears from attribute region 502i corresponding to attributes data CDI obtained by analyzing document data 209 linked thereto, and moves towards the inside of displaying region 501.

FIGS. 12–16 illustrate display examples of link string 503 on the display shown in FIG. 11. For example, document data 209 linked with link string 503 reading "トキのひな、誕生秒読み" in FIG. 7A has its attributes data CDI indicating "society". Thus, display of link string 503 starts at attribute region 502i, in FIG. 11, corresponding to attribute 216i ("society") that matches attributes data CDI, and moves into displaying region 501 (see FIG. 12). The display continues to move in displaying region 501 (see FIG. 13). Thereafter, it changes its moving direction as shown in an arrow A (see FIG. 14), and continues to move until it goes out of displaying region 501 through the same attribute region 502i from which it had entered.

As described above, attributes data CDI obtained from the analysis results of documents parser 210 can be made relate to display starting positions in displaying region 501. Therefore, when link string 503 appears in display region 501, a user is able to know the contents of document data 209 linked with link string 503, based on the position where the display of the link has started. Thus, it becomes readily possible for the user to refer to link string 503 which he/she is interested in.

Figure 16:
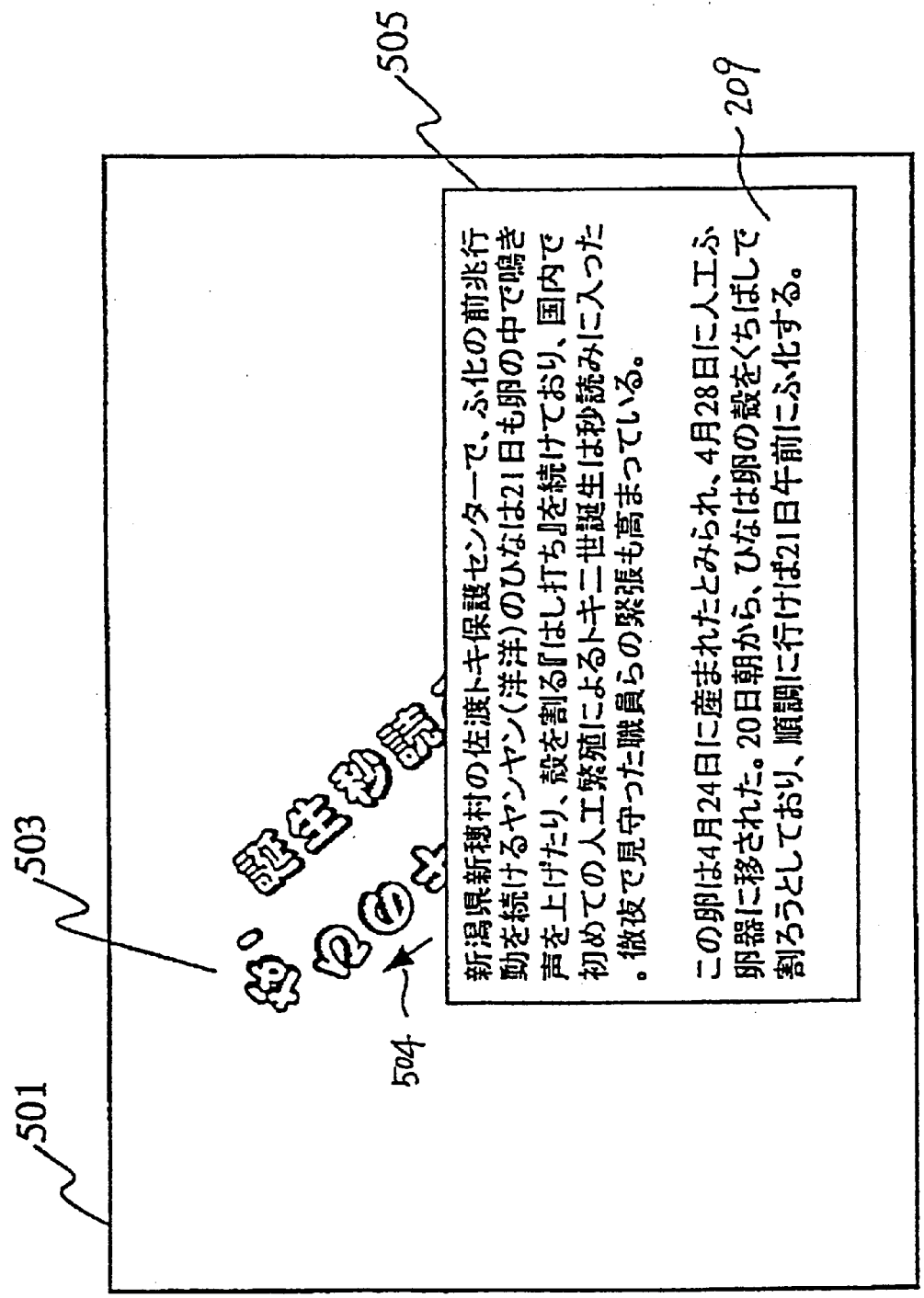
FIG. 16 illustrates the link string and document data linked thereto being displayed on the display of FIG. 11.

Further, when the user points the link string 503 moving in displaying region 501 with a mouse cursor 504, as shown in FIG. 16, a window 505 is presented in which the document data 209 linked with the link string 503 is displayed.

Another display example is as follows. Specifically, in documents parser 210, the most significant attributes data CDI and the second most significant attributes data CDI of document data 209 are obtained by calculation through the analysis as described above. Movement of link string 503 is controlled such that it enters displaying region 501 from attribute region 502i corresponding to the most significant attributes data CDI, moves in displaying region 501 while being displayed, and then goes out of displaying region 501 through another attribute region 502i corresponding to the second most significant attributes data CDI. Thus, from the moving pattern of link string in displaying region 501, a user is able to know the contents shown by document data 209 in more detail.

Another moving pattern may also be generated for link string 503, based on an attribute other than attributes data CDI. For example, information concerning the importance may be assigned to link string 503, and the one having a high degree of importance may be forced to go round within displaying region 501.

The moving pattern of link string 503 is not limited to those of two dimensions. The pattern may be calculated so that the string moves in three dimensions. Further, two or more link strings 503 may be moved and displayed at the same time.

Figure 17:
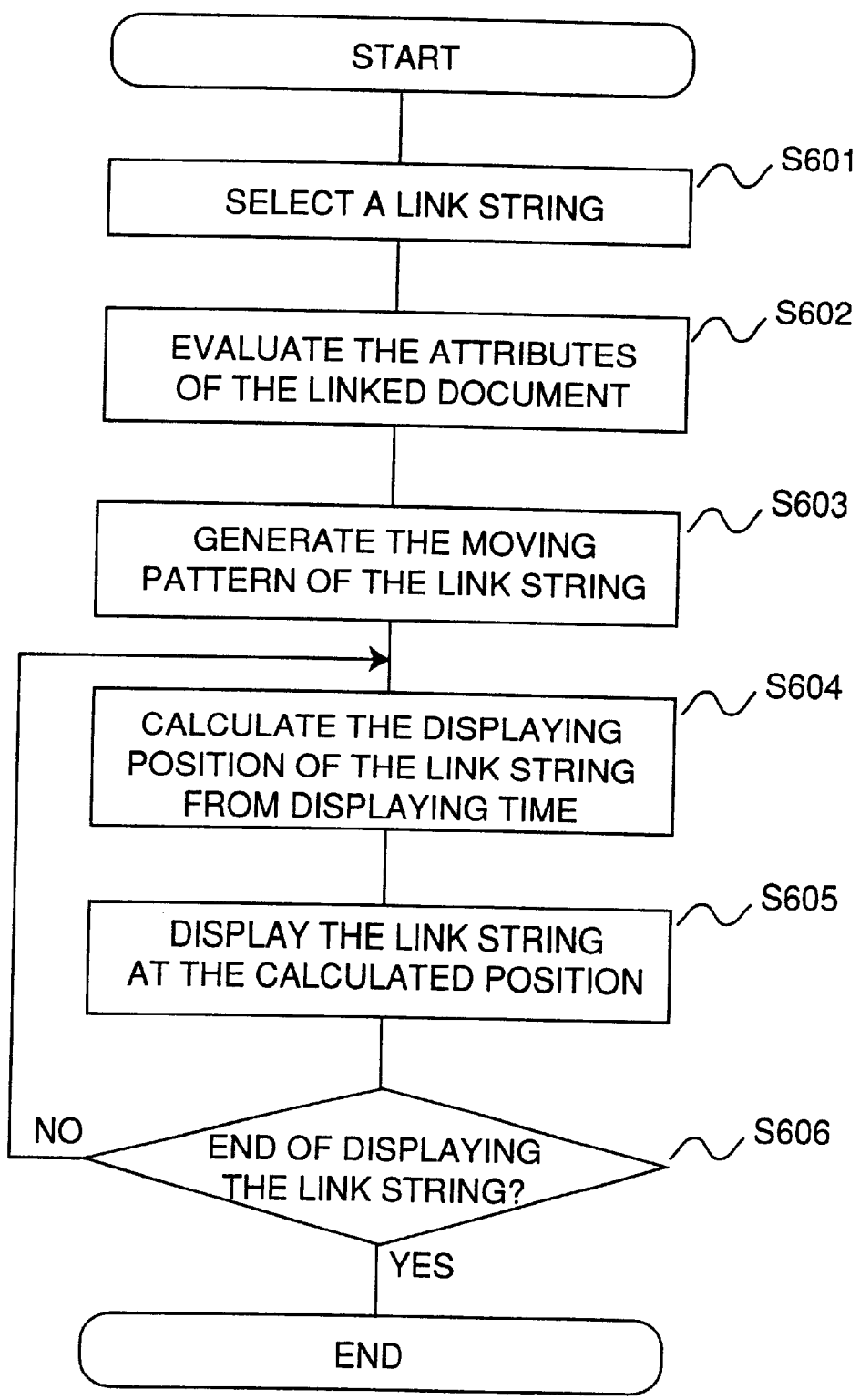
FIG. 17 is a schematic flow chart illustrating a process for displaying a link string according to the second embodiment.

FIG. 17 is a schematic flow chart of a process for displaying link strings according to the second embodiment. Referring to FIG. 17, the process for displaying link string 503 will be described. First, CPU 101 chooses and reads out, from a plurality of link strings 503 stored in documents storage unit 201, link string 503 that is to be displayed next (step S601). The procedure for choosing link string 503 is identical to step S401 described above in conjunction with FIG. 5.

Next, referring to document data 209 linked with link string 503 thus selected and read out, documents parser 210 executes analysis as described above to obtain its attributes data CDI (step S602). Next, from thus obtained attributes data CDI, a moving pattern of link string 503 in displaying region 501 is generated (step S603).

Next, a displaying position of link string 503 in displaying region 501 is calculated based on the elapsed time from the start of display therein (step S604). For example, if link string 503 moves according to the moving pattern at a constant velocity, a displaying position of the leading part of link string 503 is calculated as a distance L*t/T from a starting position of the moving pattern, where L is a variable representing an entire length of the moving pattern, T is a variable representing an entire displaying time of link string 503; and t is a variable representing an elapsed time from the start of display. Next, link string 503 is displayed based on the displaying position thus calculated (step S605). A determination is then made whether display of link string 503 is completed (step S606). If not, process returns to step S604 to continue. At the end of display, the process is completed.

The above-described process is repeated sequentially for respective link strings 503 within documents storage unit 201, to realize the function as the electric bulletin board.

If the above-described process is configured to be performed in parallel for a plurality of link strings 503, a plurality of link strings 503 can be displayed in displaying region 501 simultaneously.

Third Embodiment

The third embodiment of the present invention will now be described.

Figure 18A:
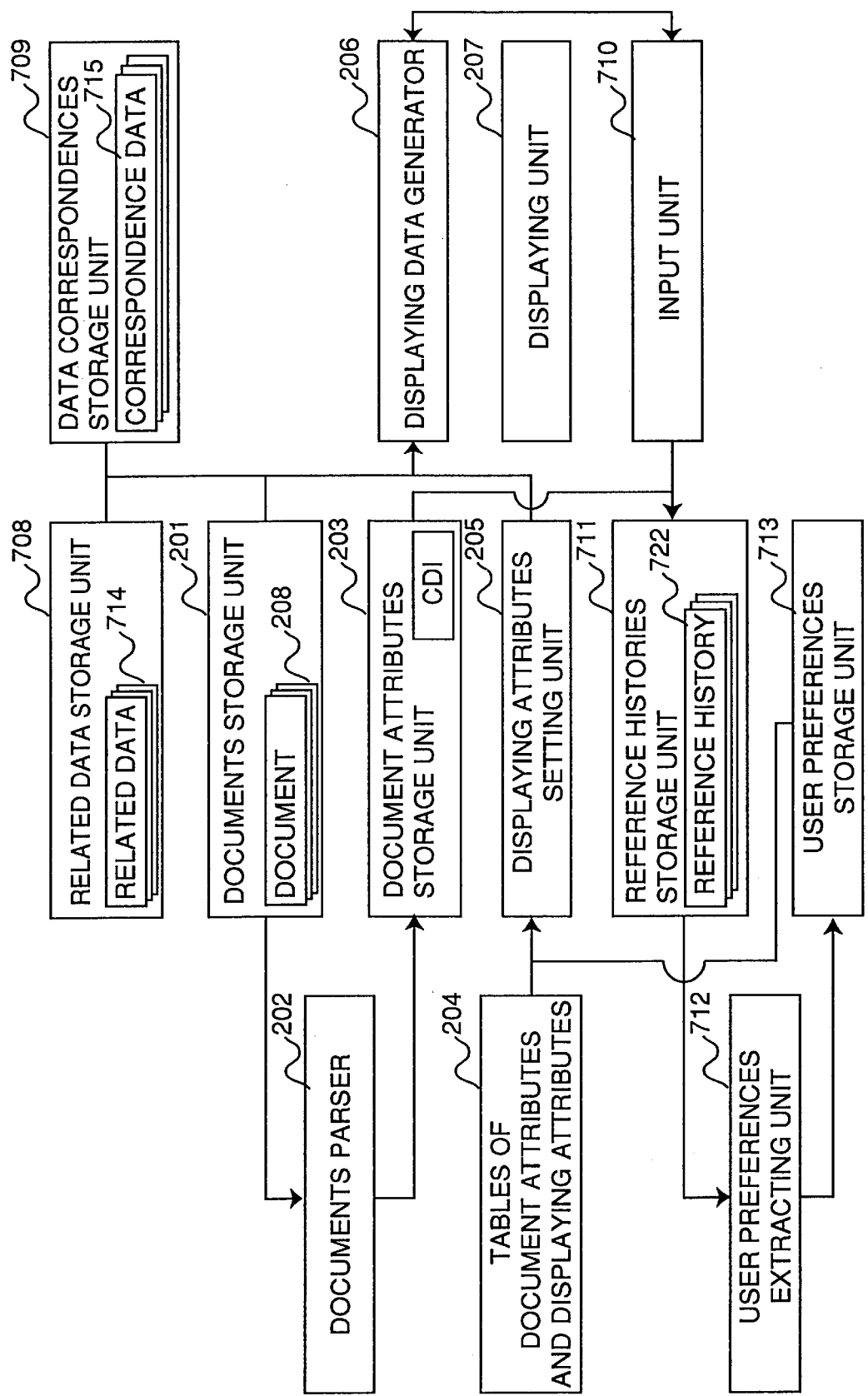
FIG. 18A is a block diagram showing a configuration of an information presentation apparatus according to a third embodiment of the present invention.

FIG. 18A is a block diagram showing a configuration of the information presentation apparatus according to the third embodiment. Referring to FIG. 18A, the information presentation apparatus includes: a documents storage unit 201; a documents parser 202; a document attributes storage unit 203; tables of document attributes and displaying attributes 204; a displaying attributes setting unit 205; a displaying data generator 206; a displaying unit 207; a related data storage unit 708; a data correspondences storage unit 709; an input unit 710 corresponding to input device 110; a reference histories storage unit 711; a user preferences extracting unit 712; and a user preferences storage unit 713.

Documents storage unit 201, documents parser 202, document attributes storage unit 203, tables of document attributes and displaying attributes 204, displaying attributes setting unit 205, displaying data generator 206 and displaying unit 207 have functions that are identical to those described in conjunction with FIG. 2A, and therefore, description thereof is not repeated here.

Related data storage unit 708 stores, as related data 714, various data including letters, images, motion pictures and sounds that are related to document data 208.

Data correspondences storage unit 709 stores correspondence data 715 that indicate correspondences between respective document data 208 stored in documents storage unit 201 and respective related data 714 stored in related data storage unit 708. One correspondence data 715 indicates, for example, that at least one related data 714 is related to one document data 208 like, e.g., related data 714 named "bar.dat" is related to document data 208) named "foo.txt". In document data 208, and hyperlinked data 209 such correspondence with related data 714 may be described using markup languages including SGLM, HTML and XML. In this case, documents parser 202 may analyze document data 208 to extract correspondence data 715, which may be stored in data correspondences storage unit 709.

Alternatively, in the case where correspondence data 715 are not explicitly described, they may be automatically created by retrieving related data 714 with a keyword appearing in document data 208, for example, and the data 715 thus created may be stored in data correspondence storage unit 709.

For pointing and selecting a content displayed on displaying unit 207, input unit 710 is provided that is externally operated by a user. Document data 208 corresponding to the pointed position is determined from a coordinate of the position in displaying region 501 of displaying unit 207 that was designated by input unit 710 and also from a displaying content that was generated by displaying data generator 206. Reference history data 722 indicating whether document data 208 has been pointed and referred to is stored in reference histories storage unit 711. At this time, reference histories storage unit 711 may also store attributes data of the relevant document data 208.

User preferences extracting unit 712 calculates and extracts, based on the contents stored in reference histories storage unit 711, which kinds of document attributes are included in document data 208 that the user is interested in. For example, if document data 208 having a particular attribute included therein is referred to by the user a large number of times, it is determined that the user is interested in the attribute. It is further preferable to take into consideration the time when the reference is made. For example, if reference histories storage unit 711 has stored information that the user has an interest in document data 208 having an attribute of economy in the morning and sports in the evening, the user preference data can be extracted based on a specific condition. To extract such preference data, conventional statistic processing or a technology known as data mining may be utilized, which are not described here in detail.

User preferences storage unit 713 stores information concerning the user preferences extracted from calculation by user preferences extracting unit 712. Alternatively, the user may operate input unit 710 to explicitly write into user preferences storage unit 713 any attribute of document data 208 which the user is interested in. Displaying attributes setting unit 205 refers to the information stored in user preferences storage unit 713 for identifying the displaying attributes of document data 208.

FIGS. 19–23 illustrate display examples of document data according to the third embodiment. Referring to FIGS. 19–23, a displaying manner of program information such as a TV program in the information presentation apparatus according to the third embodiment will be described.

FIG. 19 shows a display example of program information in a display region of displaying unit 207. In FIG. 19, wavy lines, horizontal lines and vertical lines at the backgrounds of letters represent different background colors. More specifically, for each of a plurality of broadcasting stations 716, program data 718$i$ (i=1, 2, 3, . . . ) are shown to indicate the TV programs to be broadcasted at respective broadcasting hours 717. For program data 718$i$, attributes data CDI of document data 208 describing corresponding program contents are prestored in document attributes storage unit 203, as in the case of document data 208 of FIG. 3. Alternatively, attributes data CDI may be evaluated by analyzing document data 208 describing the program contents, and set to document attributes storage unit 203. Each program data 718i is displayed with its background color assigned thereto based on the attribute thus set, as shown in FIG. 19. FIG. 20 is a table showing relations between respective attributes data 719 indicating document attributes of the program data and background color data 720 specifying the background colors assigned thereto, according to the third embodiment. Such data are uniquely stored in advance in ROM102 or the like.

FIG. 21 shows another display example corresponding to the display example in FIG. 19, with its size being reduced in the direction of broadcasting hours 717 so as to list more program data 718i within the same area. In FIG. 21, each program data 718i has its displaying contents omitted or displayed with smaller letters to fit into the limited display region. Though this may cause a user some difficulty to read and recognize the contents of program data 718i, he/she can readily understand the attribute of each program from the background color of program data 718i. Instead of the background color, the displaying font of program data 718i may be changed. In this case, again, determination of the contents of corresponding programs is readily possible according to the impression perceived from the letters of different fonts.

FIG. 22 shows a further display example in which program data are displayed based on both the reference history data stored in reference histories storage unit 711 and the current time information. In FIG. 22, compared to the display shown in FIG. 19, colors of the letters of program data 718i on display have been changed according to reference history 222 in reference histories storage unit 711 showing that the user often refers to program data 718i having the attribute of "drama" and also according to the fact that the current broadcasting hour is 19:00 (i.e., 7:00 p.m.). More specifically, program data 718i having an attribute other than "drama" are displayed with letters in lighter tones. On the contrary, among program data 718i having the attribute of "drama" (those pointed by arrows C1–C4 in FIG. 22), program data 718i pointed by arrow C3 (program titled 怒りんぼ う将軍) that is currently on air, for example, is displayed with letters in an especially striking color. Thus, program data 718i can be displayed in a manner reflecting various conditions such as a user's taste or a broadcasting hour.

FIG. 23 shows a displaying state in which detailed information about arbitrary program data 718i in FIG. 19 is additionally displayed. When arbitrary program data 718i is selected on displaying unit 207 as shown in FIG. 19 by, e.g., a mouse cursor MC of input unit 710, a window 722 can be displayed for presentation of program detailed information 721 about the selected program data 718i. Program detailed information 721 includes not only document data 208 describing, in detail, program contents corresponding to the selected program data 718i, but also data related to the relevant document data 208 including images, motion pictures and sounds for the program, which are altogether displayed (output). Here, the window in which program detailed information 721 is to be displayed is opened in response to the program data 718i shown by arrow D being selected by, e.g., the mouse cursor of input unit 710.

Figure 24:
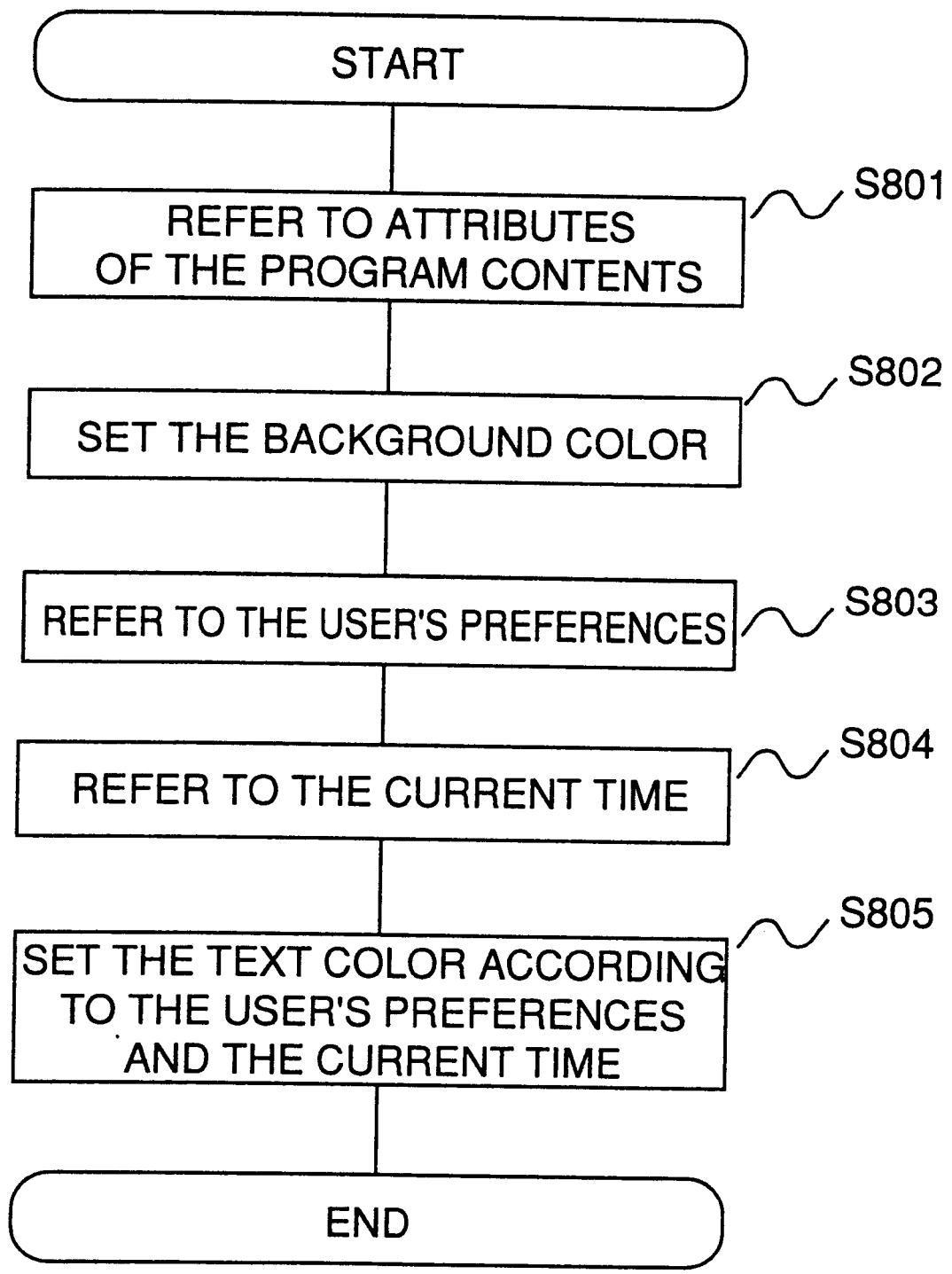
FIG. 24 is a schematic flow chart of a process for displaying program data according to the third embodiment.

FIG. 24 is a schematic flow chart of a process for displaying program data according to the third embodiment of the present invention. Referring to FIG. 24, CPU 101 first refers to attributes data CDI of the program contents being stored in document attributes storage unit 203 (step S801). Alternatively, attributes data CDI that were analyzed and calculated by documents parser 202 from corresponding document data 208 describing the program contents and stored in documents storage unit 201 may be used. Next, by referring to the background color table of FIG. 20 included in tables of document attributes and displaying attributes 204, background color data 720 corresponding to attributes data CDI that were referred to in step S801 are identified, and the background color is set (step S802).

Next, information of user's preferences that is prestored in user's preferences data storage unit 713 is referred to (step S803). The user's preferences information may include data extracted from users reference histories showing which types of programs the user is interested in, or it may be explicitly set by the user via input unit 710.

Next, the current time is referred to (step S804). Here, a clock within the system (not shown) or time information presented via communication network 111 may be referred to.

Next, attributes data CDI of program contents obtained in step S801, the user's preferences information obtained in step S803, and the current time information obtained in step S804 are related to one another, and a displaying attribute of the program data, e.g., a text color for display, is set by displaying attributes setting unit 205 (step S805).

Figure 25:
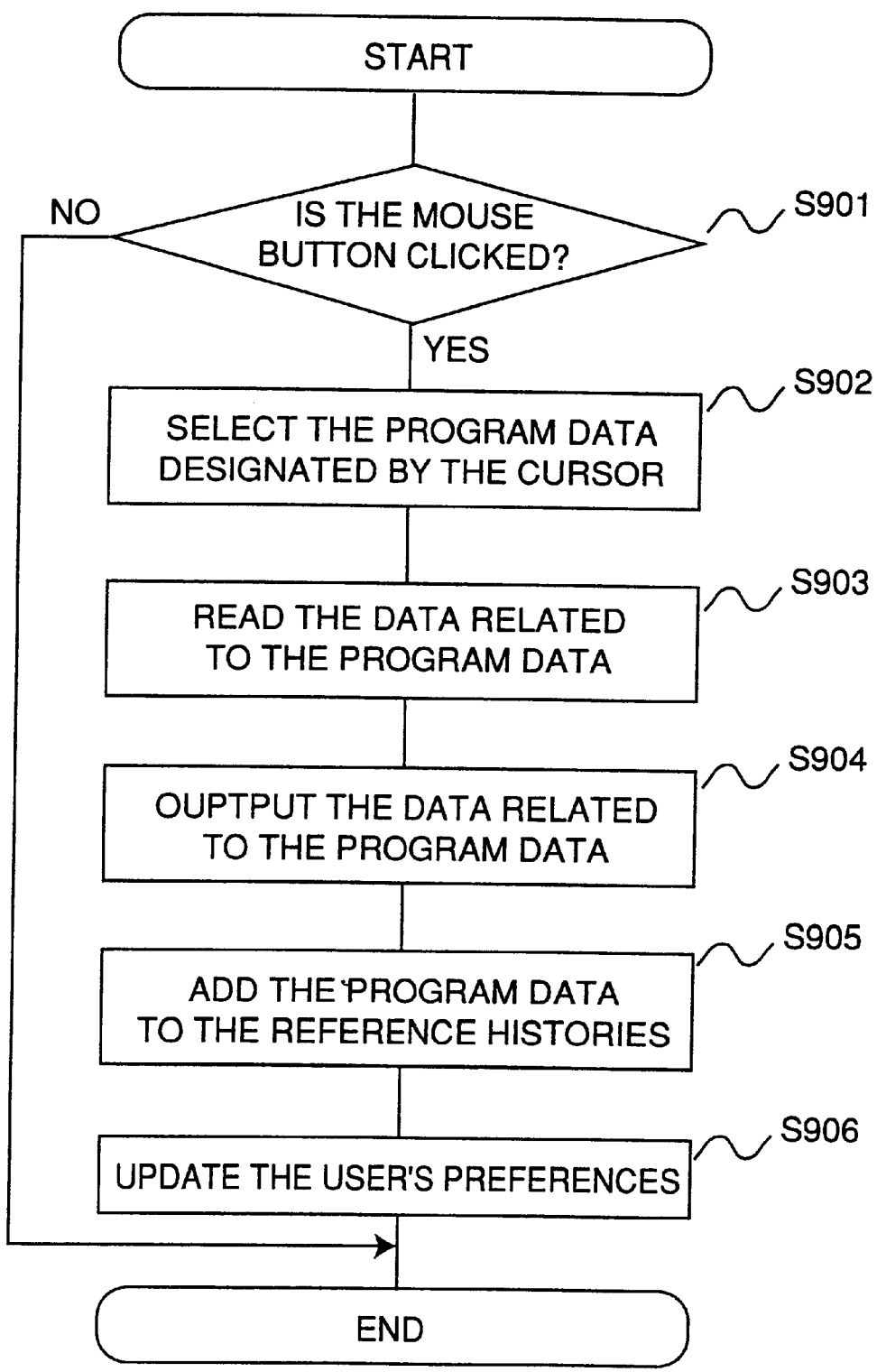
FIG. 25 is a schematic flow chart illustrating a process for referring to detailed information of program data according to the third embodiment.

FIG. 25 is a schematic flow chart of a process for referring to detailed information of program data according to the third embodiment. Here, assume that the contents shown in FIG. 19 are displayed on displaying unit 207. Referring to FIG. 25, input unit 710 first determines whether a user has clicked the mouse button (step S901). If not, it means that any program data 718i on displaying unit 207 has not been selected, so that the process is terminated.

If the mouse button has been clicked, CPU 101 inquires of displaying data generator 206 which program data 718i has been designated by the mouse cursor, and the designated program data 718i is selected (step S902). Next, related data 714 that is related to program data 718i selected in step S902 is read out from related data storage unit 708, based on the correspondence data 715 stored in data correspondences storage unit 709 (step S903).

Related data 714 thus read out is displayed on displaying unit 207 or output as sound from sound output device 108 (step S904). Next, a reference history 722 for the selected program data 718i in reference histories storage unit 718 is updated (step S905). User's preferences extracting unit 712 then examines, based on the user's reference histories 722 stored in reference histories storage unit 711, which kinds of document attributes are included in program data 718i that the user is interested in, and updates the contents of user's preferences storage unit 713 (step S906).

Figure 18B:
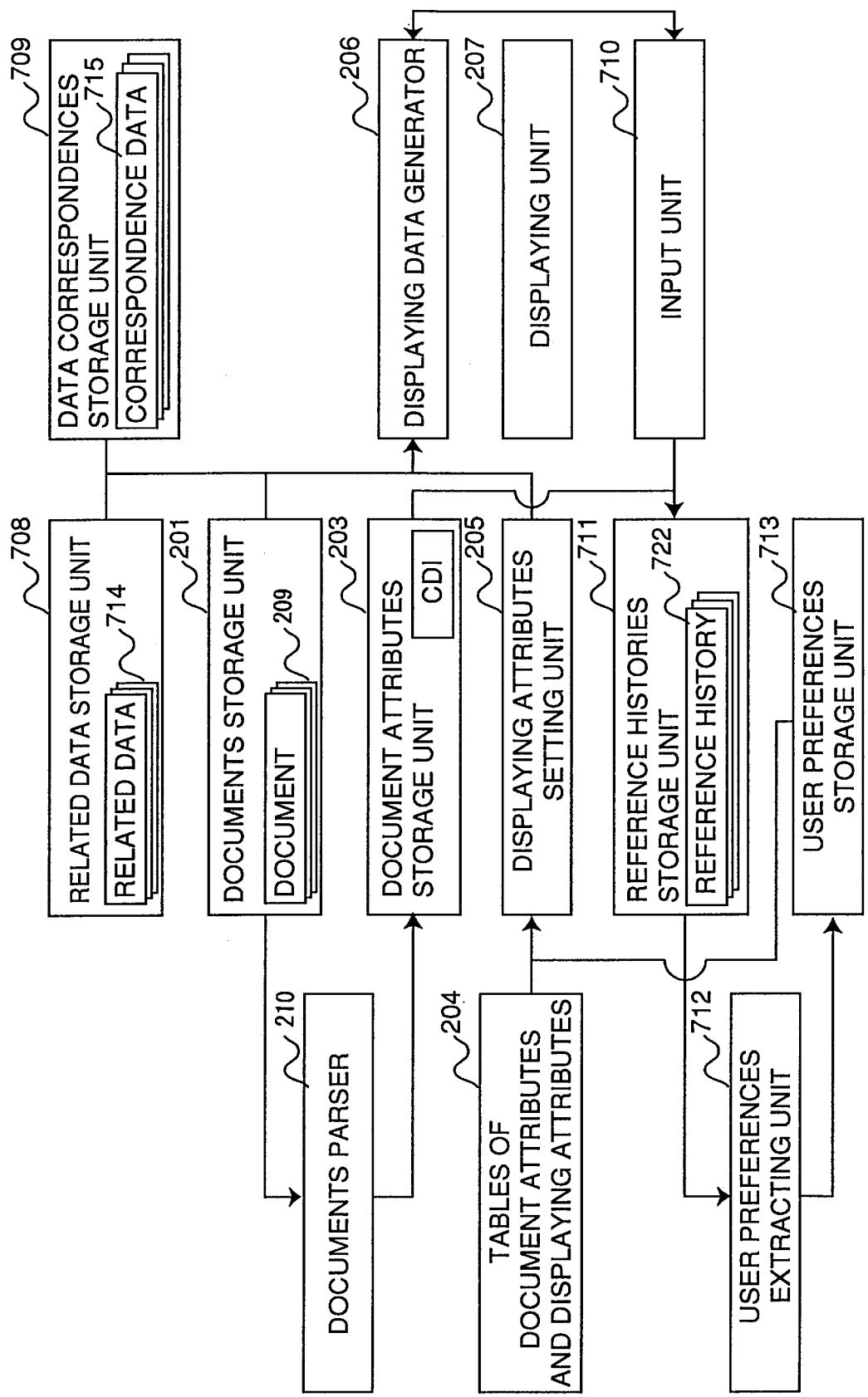
FIG. 18B is a block diagram showing a configuration of an information presentation apparatus according to another embodiment of the invention.

FIG. 18B is a block diagram showing the configuration of the information presentation apparatus according to another aspect of the third embodiment. Like numerals are utilized to indicate like structures, the primary difference being the use of parser 210, which operates on document data 209. As discussed above in connection with the second embodiment, document data 209 is generated using hyperlinks and is operated on by parser 210, operating similarly to parser 202 of the third embodiment. In other words, the methods of the third embodiment are applied to document data 209, which is generated utilizing a hyperlink and parsed in accordance with parser 210.

The user's preferences data can be flexibly managed as it is independent of the attributes data. For example, the preferences data may be shared by different applications, or readily changed according to the different applications.

Fourth Embodiment

The fourth embodiment of the present invention will now be described.

Figure 26B:
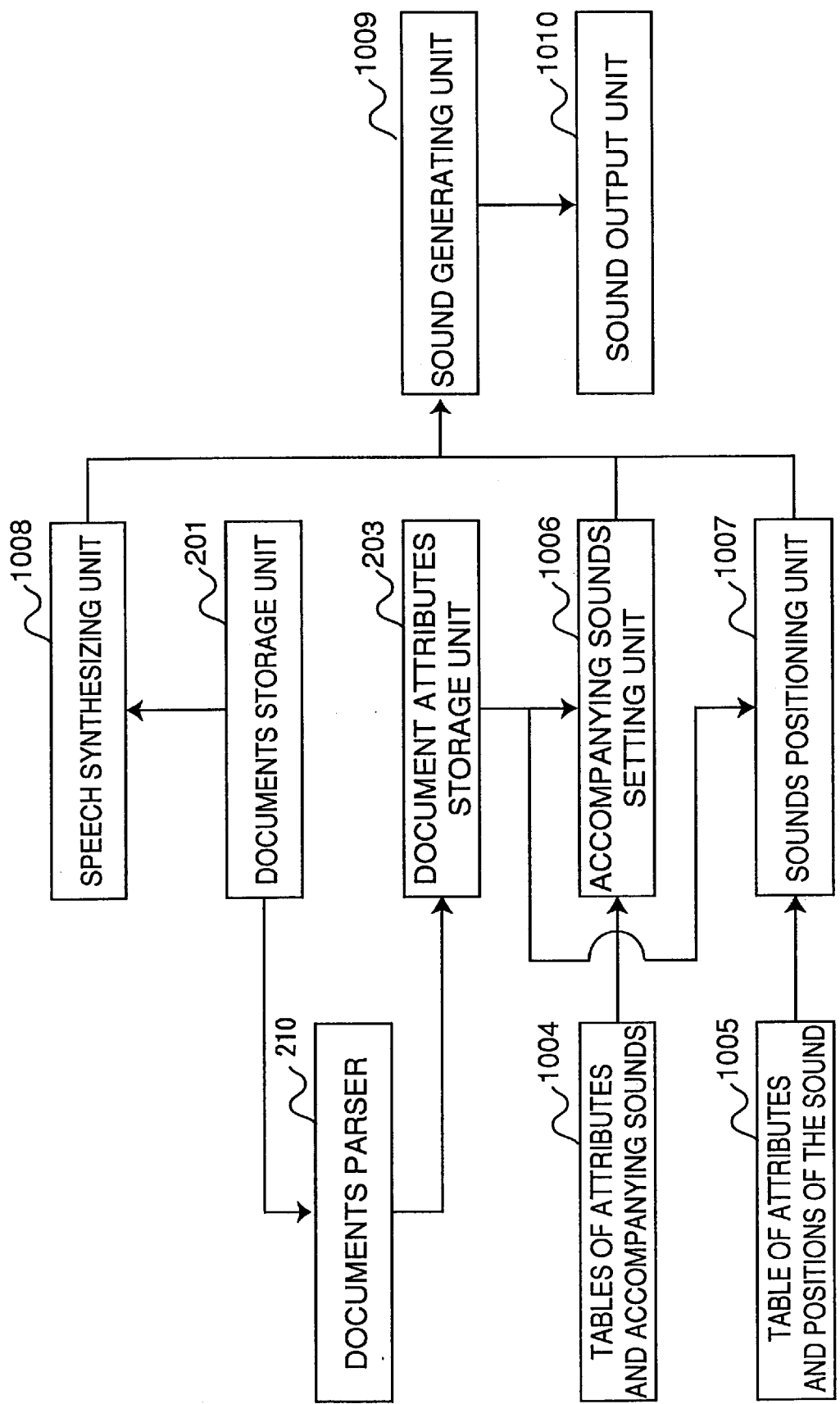
FIG. 26B is a block diagram showing a configuration in accordance with another embodiment of the invention.

FIGS. 26A and 26B show two applications of the third embodiment in a block configuration of an information presentation apparatus according to the fourth embodiment. The difference between the two applications is that one application is applied to document data 208 utilizing parser 202 and the second application is applied to document data 209 utilizing parser 210. For ease of discussion, the two applications are described together. Referring to FIGS. 26A and 26B, the information presentation apparatus includes a documents storage unit 201, a documents parser 202, 210, a document attributes storage unit 203, tables of document attributes and accompanying sounds 1004, a table of document attributes and positions of the sound 1005, an accompanying sounds setting unit 1006, a sounds positioning unit 1007, a speech synthesizing unit 1008, a sound generating unit 1009, and a sound output unit 1010.

Documents storage unit 201, documents parser 202 and document attributes storage unit 203 are similar to those described in conjunction with FIG. 2, so that description thereof is not repeated here.

Tables of document attributes and accompanying sounds 1004 include a plurality of tables storing correspondences between attributes data CDI obtained from document data 208, 209 and data of accompanying sounds. FIGS. 27A–27C show, by way of example, tables of document attributes and accompanying sounds TB5–TB7 included in the tables 1004.

Here, the accompanying sound refers to arbitrarily patterned sound data that is output from sound output unit 1010 in relation to corresponding attributes data CDI. More specifically, data of the accompanying sound, i.e., sound attributes data AT5–AT7 indicating melody, tone and tempo of the sound, are set in correspondence with respective attributes data CD1–CD3 indicating category, importance and date of delivery of document data 208, 209 that are indicated by respective tags as shown in FIG. 3.

Now, assume that documents parser 202, 210 has obtained attributes data CDI of document data 208, 209 indicating that the category is "society", the degree of its importance is "high", and it was delivered "within one hour". In this case, accompanying sounds setting unit 1006 retrieves data from the tables shown in FIGS. 27A–27C based on thus obtained attributes data CDI, and sets the accompanying sound for document data 208, 209 such that the melody of "C, E, G, E, C" is output at a tempo of 90 bpm in a tone of guitar.

Instead of being simple sounds as in this example, the accompanying sounds may be common music or sampled voices. Further, the contents of tables of attributes and accompanying sounds TB5–TB7 may be changed, rather than fixed, dependent on conditions of the system. Specifically, they may be changed according to the sound attributes of sound generating unit 1009 and sound output unit 1010, as in the case of the above-described tables of document attributes and displaying attributes TB1–TB4.

Table of document attributes and positions of the sound 1005 stores correspondences between attributes data CDI of document data 208, 209 and data of positions where the sound is to be positioned. Positioning the sound means to decide the position and direction where the sound is to be originated, by changing, e.g., wavelength or amplitude of the sound. Thus, a user is able to hear the sound from various directions and positions, up and down, and left and right. Sound positioning unit 1007 sets the position of the accompanying sound by retrieving data from table of attributes and positions of the sound 1005, based on attributes data CDI, e.g., "reference history" (attributes data CD4), of document data 208, 209. More specifically, if the reference history shows that no reference has been made before, the accompanying sound is positioned in the center. If it shows that reference has been made once, the sound is positioned to the right, and if the reference has been made more than once, it is positioned to the left.

Speech synthesizing unit 1008 synthesizes speech sound data from respective document data 208 (209) stored in documents storage unit 201, employing any conventional technique.

Sound generating unit 1009 generates the sound set by accompanying sounds setting unit 1006 or synthesized by speech synthesizing unit 1008 by changing its amplitude, wavelength or the like, such that the sound is positioned in the position set by sounds positioning unit 1007. The sound generated by sound generating unit 1009 is output from sound output unit 1010.

Figure 28:
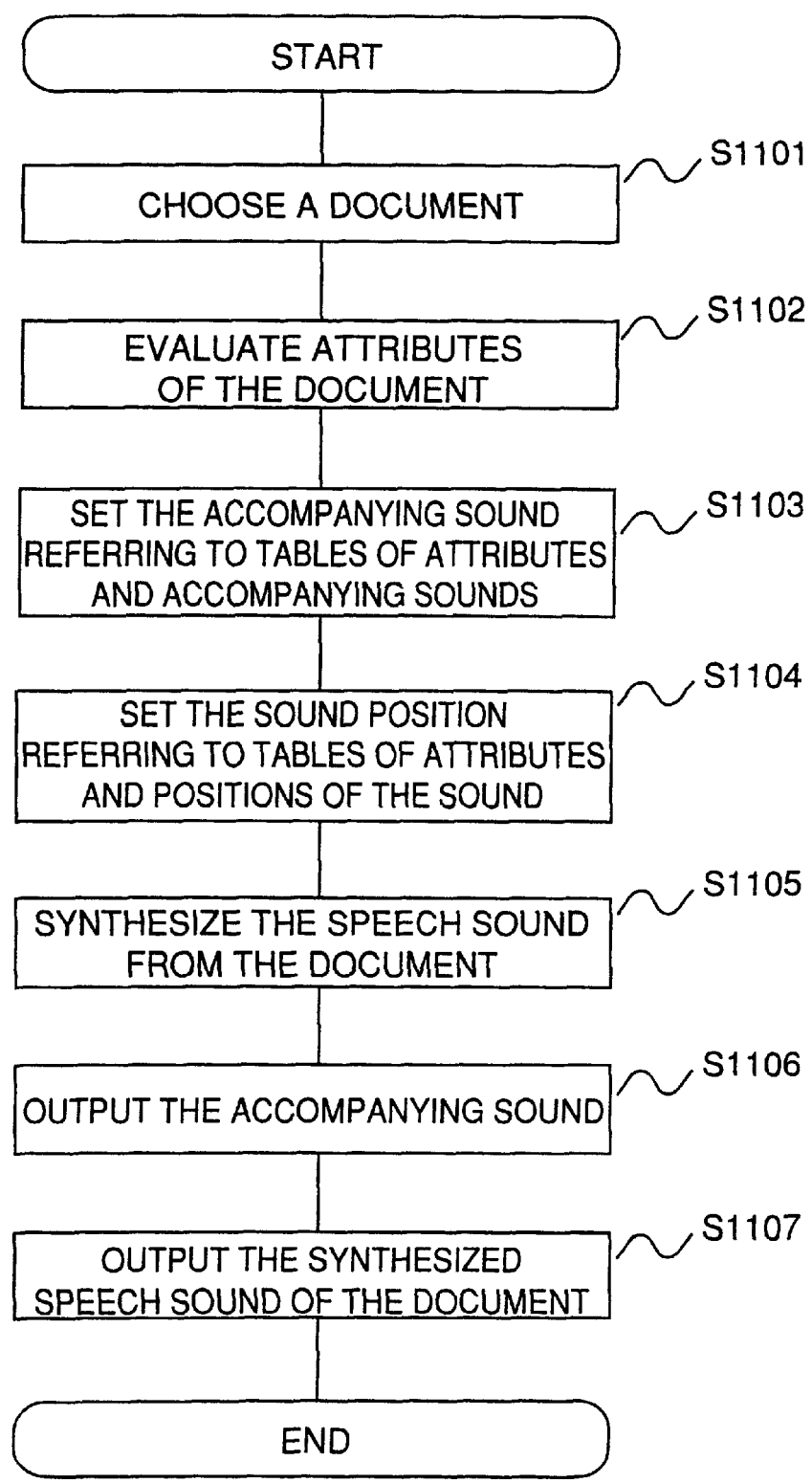
FIG. 28 is a schematic flow chart illustrating processing performed by the information presentation apparatus according to the fourth embodiment.

FIG. 28 is a schematic flow chart illustrating processing in the information presentation apparatus according to the fourth embodiment. Referring to FIG. 28, CPU 101 first chooses, from a plurality of document data 208, 209 stored in documents storage unit 201, document data 208, 209 that is to be presented next (step SI 101). Which document data 208, 209 is to be chosen is decided in the same manner as described above.

Next, attributes data CDI of the selected document data 208, 209 are evaluated by documents parser 202 and stored in document attributes storage unit 203 (step S1102). The method of evaluating attributes data CDI is the same as described above.

Next, accompanying sounds setting unit 1006 retrieves data from tables of attributes and accompanying sounds 1004 based on the attributes data CDI stored in document attributes storage unit 203, and sets the accompanying sound corresponding to the relevant document data 208, 209 (step S1103). Sounds positioning unit 1007 then retrieves data from table of attributes and positions of the sound 1005 based on the attributes data CDI within document attributes storage unit 203, and sets the position for the accompanying sound (step S1104).

Next, speech synthesizing unit 1008 converts the relevant document data 208, 209 into speech sound data (step S1105). The accompanying sound that was set in step S1103 is then generated by sound generating unit 1009 and output by sound output unit 1010, at the position that was set in step S1104 (step S1106). Next, document data 208, 209 converted into the speech sound is generated by sound generating unit 1009 and output by sound output unit 1010 at the position set in step S1104 (step S1107).

The information presentation apparatus of FIG. 26 may also be used to present document data 208 shown in FIG. 3. Assume that attributes data CDI have been obtained from the document data 208 in FIG. 3, indicating that the category is "society", its degree of importance is "high", it was delivered "within one hour", and its reference history is "none". Based on such attributes data CDI, data in tables of attributes and accompanying sounds TB5–TB7, shown in FIGS. 27A–27C, and table of attributes and positions of the sound 1005 are retrieved, and thus, the accompanying sound of the relevant document data 208 is set such that the melody AT5 of "C, E, G, E, C" is played at the tempo AT7 of 90 bpm in the tone AT6 of guitar, at a position located in the center. This accompanying sound is output according to the contents thus set, which is followed by output as sounds of the contents of the relevant document data 208, i.e., the title delimited by <title> tag 301 and </title> tag 302 and the body delimited by <body> tag 307 and </body> tag 308.

Accordingly, as presentation (or sound output) of the contents of document data 208 is preceded by its accompanying sound, a user is able to estimate the contents of document data 208 before listening thereto. Further, although the document data 208 was output as synthesized speech sound in this example, it may be presented as text data on display.

Fifth Embodiment

The fifth embodiment of the present invention will now be described. In the fifth embodiment, a computer readable recording medium with an information presentation program recorded therein will be described.

The above-described information presentation apparatus is implemented with a program that allows information presentation processing to function. This program is stored in a computer readable recording medium, which, in the present embodiment, may be a ROM 102 or an external storage medium 112 that is necessary for the apparatus shown in FIG. 1 to carry out the processing. In any medium, the program stored therein may have a configuration that is accessed and executed by CPU 101. Alternatively, the program may be of the kind that is read out from such medium, temporarily loaded to a prescribed program storage area of the apparatus shown in FIG. 1, e.g., a prescribed storage area in CPU 101, and then read out from the prescribed storage area and executed by CPU 101. The program for loading is supposed to be prestored in the apparatus of FIG. 1.

Here, the program recording medium may be the one that is configured to be separable from the apparatus of FIG. 1. More specifically, the medium may be the one holding the program in a fixed manner, or may be the one holding the program in a flux manner. The media holding the program in the fixed manner include: those of tapes, such as magnetic tape and cassette tape; those of discs, including magnetic discs, such as floppy disc and hard disc, and optic discs, such as CD (compact disc)-ROM, MO (magneto-optical disc), MD (mini disc) and DVD (digital versatile disc); those of cards, such as IC (integrated circuit) card (including memory card) and optical card; and semiconductor memories, such as mask ROM, EPROM (erasable and programmable ROM), EEPROM (electrically EPROM) and flash ROM.

The media holding the program in the flux manner include a memory within an apparatus in which a program is downloaded from communication network 111. In the case where a program is to be downloaded from communication network 111 to the memory within the apparatus, the program for downloading may be prestored in the memory within the apparatus, or may be preinstalled from another recording medium to the memory. The content being stored in the recording medium is not limited to such program; it may include any data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information presentation apparatus, comprising:
    storage means for storing information including at least one document data;
    said storage means further storing at least one link string representing said link when at least two said document data are related to each other by a link;
    output means having a displaying unit for externally outputting said document data;
    displaying attribute determination means for determining at least one displaying attribute for outputting in a prescribed manner, said document data stored within said storage means in response to information, said information including document attribute information indicating a document attribute corresponding to a content category being represented by said document data and said displaying attribute determination means includes link attribute determination means for determining said displaying attribute of said link string stored in said storage means in response to information regarding a first of said document data that is linked with a second of said document data and designated by said prescribed link strings; and
    display control means for causing said displaying unit to display said document data according to said displaying attribute determined by said displaying attribute determination means to indicate the document attribute and including link display control means for causing said displaying unit to display said link string according to said displaying attribute determined by said link attribute determination means.

2. The information presentation apparatus according to claim 3, further including select means for selecting said link string from said at least one link string, the apparatus further comprising:
    sound control means, responsive to said link string being selected by said select means, for outputting sound corresponding to said document attribute of said document data.

3. The information presentation apparatus according to claim 1, further including document attribute extracting means that analyzes said document data to extract said document attribute.

4. The information presentation apparatus according to claim 1, wherein said information further includes user's preference information corresponding to said document attribute.

5. The information presentation apparatus according to claim 4, wherein said preference information is determined based on preference history information indicating how often said document data has been displayed on said displaying unit for reference.

6. The information presentation apparatus according to claim 1, wherein said displaying attribute determination means includes
    a table in which at least one kind of said document attribute is corresponded to at least one kind of said displaying attribute respectively, and
    retrieval means that retrieves from said table said displaying attribute corresponding to said document data.

7. The information presentation apparatus according to claim 1, wherein said displaying attribute determination means calculates and determines said displaying attribute based on said document attribute of said document data.

8. The information presentation apparatus according to claim 1, wherein said at least one kind of displaying attribute includes a font of letters being displayed on said displaying unit.

9. The information presentation apparatus according to claim 1, wherein said at least one kind of displaying attribute includes a displaying color for displaying the document data on said displaying unit.

10. The information presentation apparatus according to claim 1, wherein said at least one kind of displaying attribute is determined according to an outputting manner that is feasible by said output means.

11. The information presentation apparatus according to claim 1, wherein said output means further includes a sound output unit for output of sound, the apparatus further comprising:
sound control means for causing said sound output unit to output a sound corresponding to said document attribute of said document data in synchronization with display of said document data in said displaying unit.

12. The information presentation apparatus according to claim 11, wherein said document data is output as speech sound from said sound output unit in synchronization with said sound.

13. The information presentation apparatus according to claim 11, wherein said sound control means includes positioning means for positioning speech sound output from said sound output unit based on said document attribute of said document data.

14. The information presentation apparatus according to claim 1, wherein various kinds of information related to said document data are output via said output means in synchronization with display of said document data.

15. An information presentation apparatus, comprising:
storage means for storing information including at least one document data;
output means having a displaying unit for externally outputting said document data;
displaying attribute determination means for determining at least one displaying attribute for outputting in a prescribed manner, said document data stored within said storage means in response to information, said information including document attribute information indicating a document attribute corresponding to a content category being represented by said document data; and
display control means for causing said displaying unit to display said document data according to said displaying attribute determined by said displaying attribute determination means to indicate the document attribute wherein, when the information is moved along said displaying unit while being displayed on said displaying unit, said at least one kind of displaying attribute includes a pattern of the movement.

16. The information presentation apparatus according to claim 15, further including document attribute extracting means that analyzes said document data to extract said document attribute.

17. The information presentation apparatus according to claim 15, wherein said information further includes user's preference information corresponding to said document attribute.

18. The information presentation apparatus according to claim 15, wherein said displaying attribute determination means includes
a table in which at least one kind of said document attribute is corresponded to at least one kind of said displaying attribute respectively, and
retrieval means that retrieves from said table said displaying attribute corresponding to said document data.

19. The information presentation apparatus according to claim 15, wherein said displaying attribute determination means calculates and determines said displaying attribute based on said document attribute of said document data.

20. The information presentation apparatus according to claim 15, wherein said at least one kind of displaying attribute includes a font of letters being displayed on said displaying unit.

21. The information presentation apparatus according to claim 15, wherein said at least one kind of displaying attribute includes a displaying color for displaying the document data on said displaying unit.

22. The information presentation apparatus according to claim 15, wherein said at least one kind of displaying attribute is determined according to an outputting manner that is feasible by said output means.

23. The information presentation apparatus according to claim 15, wherein said output means further includes a sound output unit for output of sound, the apparatus further comprising:
sound control means for causing said sound output unit to output a sound corresponding to said document attribute of said document data in synchronization with display of said document data in said displaying unit.

24. The information presentation apparatus according to claim 15, wherein various kinds of information related to said document data are output via said output means in synchronization with display of said document data.

25. An information presentation method comprising:
storing information including at least one document data, relating at least two document data by a link, and storing at least one link string representing said link;
a displaying attribute determination step for determining at least one displaying attribute for outputting document data in response to information, said information including document attribute information indicating a document attribute corresponding to a content category being represented by said document data and determining said display attribute of said stored link string in response to information regarding a first of said document data that is linked with a second of said document data and designated by said prescribed link string; and
a displaying step for displaying said document data according to said displaying attribute information determined by said displaying attribute determination step to indicate the document attribute and displaying said link string according to said displaying attribute determined by said link attribute determination means.

26. A computer readable recording medium with an information presentation program recorded therein for allowing a computer to execute an information presentation method,
said information presentation method comprising:
storing information including at least one document data, relating at least two document data by a link, and storing at least one link string representing said link;
a displaying attribute determination step for determining at least one displaying attribute for outputting document data in response to information, said information including document attribute information indicating a document attribute corresponding to a content category being represented by said document data and determining said display attribute of said stored link string in response to information regarding a first of said document data that is linked with a second of said document data and designated by said prescribed link string; and a displaying step for displaying said document data according to said displaying attribute information determined by said displaying attribute determination step to indicate the document attribute and displaying said link string according to said displaying attribute determined by said link attribute determination means.

27. An information presentation method comprising the steps of:

storing information including at least one document data;

determining at least one displaying attribute for outputting in a prescribed manner, said document data stored within said storage means in response to information, said information including document attribute information indicating a document attribute corresponding to a content category being represented by the document data; and displaying the document data at a display unit according to said display attribute determined by said displaying attribute determination to indicate the document attribute by moving the information along the display unit in a pattern of movement which indicates at least one kind of displaying attribute.

28. A computer readable recording medium with an information presentation program recorded therein for allowing a computer to execute an information presentation method, said information presentation method comprising the steps of:

storing information including at least one document data;

determining at least one displaying attribute for outputting in a prescribed manner, said document data stored within said storage means in response to information, said information including document attribute information indicating a document attribute corresponding to a content category being represented by the document data; and displaying the document data at a display unit according to said display attribute determined by said displaying attribute determination to indicate the document attribute by moving the information along the display unit in a pattern of movement which indicates at least one kind of displaying attribute.

\* \* \* \* \*

UNITED STATES PATENT AND TRADEMARK OFFICE
CERTIFICATE OF CORRECTION

PATENT NO. : 6,825,849 B1
DATED : November 30, 2004
INVENTOR(S) : Mitsuru Minakuchi It is certified that error appears in the above-identified patent and that said Letters Patent is hereby corrected as shown below:

Column 20
Line 6, change first occurrence of "said" to -- a --; and
Line 7, change "a" to -- said --;
Line 32, change "3" to -- 1 --;
Line 65, delete "kind of".

Column 21,
Lines 2 and 6, delete "kind of";
Line 48, change "wherein, when" to -- by moving -- and delete "is moved";
Line 50, delete "kind of".

Column 22,
Lines 6, 10 and 14, delete "kind of".

Signed and Sealed this

Tenth Day of May, 2005

JON W. DUDAS
*Director of the United States Patent and Trademark Office*